United States Patent
Decarreau et al.

(10) Patent No.: US 11,265,780 B2
(45) Date of Patent: Mar. 1, 2022

(54) COMMUNICATION CONNECTION CONTROL PROCEDURE FOR SUPPORTING AND CONDUCTING HANDOVER

(71) Applicant: Nokia Technologies Oy, Espoo (FI)

(72) Inventors: Guillaume Decarreau, Munich (DE); Irina-Mihaela Balan, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/976,825

(22) PCT Filed: Mar. 5, 2018

(86) PCT No.: PCT/EP2018/055245
§ 371 (c)(1),
(2) Date: Aug. 31, 2020

(87) PCT Pub. No.: WO2019/170210
PCT Pub. Date: Sep. 12, 2019

(65) Prior Publication Data
US 2020/0413306 A1 Dec. 31, 2020

(51) Int. Cl.
*H04W 36/00* (2009.01)
*H04W 36/08* (2009.01)
*H04W 88/08* (2009.01)

(52) U.S. Cl.
CPC ....... *H04W 36/0079* (2018.08); *H04W 36/08* (2013.01); *H04W 88/085* (2013.01)

(58) Field of Classification Search
CPC .......................... H04W 36/0079; H04W 36/08

USPC .......................................................... 455/436
See application file for complete search history.

(56) References Cited

U.S. PATENT DOCUMENTS

| 6,208,858 B1 * | 3/2001 | Antonio ............. H04B 7/18534 |
| | | 455/429 |
| 2016/0007261 A1 | 1/2016 | Oh et al. |
| 2016/0142959 A1 | 5/2016 | Wang et al. |
| 2016/0150435 A1 | 5/2016 | Baek et al. |
| 2017/0054534 A1 * | 2/2017 | Sang ................... H04W 72/046 |

FOREIGN PATENT DOCUMENTS

| WO | 2016096006 A1 | 6/2016 |
| WO | 2019170210 A1 | 9/2019 |

* cited by examiner

*Primary Examiner* — Joel Ajayi

(57) ABSTRACT

An apparatus for use by a communication element or function configured to communicate in a communication network comprising a plurality of communications cells, the apparatus comprising at least one processing circuitry, and at least one memory for storing instructions to be executed by the processing circuitry, wherein the at least one memory and the instructions are configured to, with the at least one processing circuitry, cause the apparatus at least: to execute a handover procedure for changing a communication connection from a source cell currently serving the communication element or function to a target cell; to determine beam information indicating a communication beam of the source cell serving the communication element or function at the time when the handover procedure is executed; and to cause sending the beam information to a communication network control element or function to which the communication element is connected after the handover procedure is ended.

20 Claims, 17 Drawing Sheets

FIG. 8a

|             |             | Target Cell | 2  | 2  | 3  |
|-------------|-------------|-------------|----|----|----|
|             |             | Target beam | 1  | 2  | 1  |
| Source Cell | Source beam |             |    |    |    |
| 1           | 1           |             | 24 | 5  | 2  |
| 1           | 2           |             | 1  | 36 | 0  |
| 1           | 3           |             | 2  | 4  | 42 |

FIG. 8b

|             |             | Target Cell | 2  | 2  | 3  |
|-------------|-------------|-------------|----|----|----|
|             |             | Target beam | 1  | 2  | 1  |
| Source Cell | Source beam |             |    |    |    |
| 1           | 1           |             | 0  | 5  | 6  |
| 1           | 2           |             | 6  | 0  | 9  |
| 1           | 3           |             | 12 | 8  | 0  | ively with this National Stage application and are incorporated herein by reference in their entirety. -->

COMMUNICATION CONNECTION CONTROL PROCEDURE FOR SUPPORTING AND CONDUCTING HANDOVER

CROSS-REFERENCE TO RELATED APPLICATION

This application is the National Stage of, and therefore claims the benefit of, International Application No. PCT/EP2018/055245 filed on Mar. 5, 2018, entitled "COMMUNICATION CONNECTION CONTROL PROCEDURE FOR SUPPORTING AND CONDUCTING HANDOVER," which was published in English under International Publication Number WO 2019/170210 on Sep. 12, 2019. The above applications are commonly assigned with this National Stage application and are incorporated herein by reference in their entirety.

BACKGROUND

Field

Examples of embodiments relate to apparatuses, methods, systems, computer programs, computer program products and (non-transitory) computer-readable media usable for supporting and conducting a handover of a communication connection of a communication element or function, such as a UE, and in particular to a communication connection control procedure where a communication element or function, such as a UE, which is connected to a source cell via a communication beam (referred to hereinafter as beam) conducts a handover to a target cell to which it is connected via another beam, wherein examples of embodiments are applicable in a next generation network like a 5G communication network.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partner Project
4G fourth generation
5G fifth generation
5GC 5G core network
AMF access and mobility function
ANR automated neighbor relation
BS base station
CIO cell individual offset
CN core network
C-PLANE control plane
CU central unit
DL downlink
DU distributed unit
CPU central processing unit
eNB evolved node B
EPC evolved packet core
EPS evolved packet system
ETSI European Telecommunications Standards Institute
gNB next generation Node B
HO handover
ID identifier
IP Internet protocol
L2 layer 2
L3 layer 3
LTE Long Term Evolution
LTE-A LTE Advanced
MAC medium access control
mmW millimeter wave
MR measurement request
MRO mobility robustness optimization
NG-RAN next generation RAN
NR new radio
NRT neighbour relation table
PCI physical cell identifier
PDCP packet date convergence protocol
RACH random access channel
RAN radio access network
RAT radio access technology
RLC radio link control
RRC radio resource control
RSRP reference signal receive power
SDAP service data adaptation protocol
SON self organized network
TCI target cell identifier
TS technical specification
TTT time to trigger
UE user equipment
UMTS universal mobile telecommunication system
UPF user plane function

SUMMARY

According to an example of an embodiment, there is provided, for example, an apparatus for use by a communication element or function configured to communicate in a communication network comprising a plurality of communication cells, the apparatus comprising at least one processing circuitry, and at least one memory for storing instructions to be executed by the processing circuitry, wherein the at least one memory and the instructions are configured to, with the at least one processing circuitry, cause the apparatus at least: to execute a handover procedure for changing a communication connection from a source cell currently serving the communication element or function to a target cell; to determine beam information indicating a communication beam of the source cell serving the communication element or function at the time when the handover procedure is executed; and to cause sending the beam information to a communication network control element or function to which the communication element is connected after the handover procedure is ended.

Furthermore, according to an example of an embodiment, there is provided, for example, method for use in a communication element or function configured to communicate in a communication network comprising a plurality of communication cells, the method comprising executing a handover procedure for changing a communication connection from a source cell currently serving the communication element or function to a target cell; determining beam information indicating a communication beam of the source cell serving the communication element or function at the time when the handover procedure is executed; and causing sending the beam information to a communication network control element or function to which the communication element is connected after the handover procedure is ended.

According to further refinements, these examples may include one or more of the following features:

in case the handover procedure is completed successfully by connecting the communication element or function to the target cell, the beam information may be caused to be sent to a communication network control element or function;

sending of the beam information may be caused in a handover confirmation signaling.

a communication beam of the target cell on which the communication element or function successfully accessed the target cell when conducting the handover procedure may be determined, and an indication of the communication beam of the target cell on which the communication element or function successfully accessed the target cell when conducting the handover procedure may be included in the beam information caused to be sent to the communication network control element or function of the target cell;

sending of the beam information to a one of a central unit of the communication network control element or function of the target cell or to a distributed unit of the communication network control element or function of the target cell may be caused;

in case the handover procedure to the target cell failed, a communication connection to a recovery cell being a communication cell of the communication network may be re-established, and sending of the beam information to a communication network control element or function of the recovery cell may be caused;

a communication beam of the target cell to which the handover failed may be determined, and an indication of the communication beam of the target cell to which the handover failed may be included in the beam information caused to be sent to the communication network control element or function of the recovery cell;

handover supporting information from a communication network control element or function of the source cell may be received and processed, wherein the handover supporting information may indicate at least one preferred communication beam per candidate target cell for a handover in relation to a communication beam of the source cell serving the communication element or function at the time of conducting the handover procedure, and the handover procedure to a target cell may be conducted under consideration of the handover support information for selecting a communication beam of the target cell for accessing the target cell.

In addition, according to an example of an embodiment, there is provided, for example, an apparatus for use by a communication network control element or function of a communication cell configured to communicate with a communication element or function in a communication network comprising a plurality of communication cells, the apparatus comprising at least one processing circuitry, and at least one memory for storing instructions to be executed by the processing circuitry, wherein the at least one memory and the instructions are configured to, with the at least one processing circuitry, cause the apparatus at least: to participate in a handover procedure for changing a communication connection of the communication element or function from a source cell currently serving the communication element or function to a target cell; to obtain and process, when the handover is successfully completed, beam information indicating a communication beam of the source cell serving the communication element or function at the time when the handover procedure is executed; and to cause forwarding the beam information to a communication network control element or function of the source cell.

Furthermore, according to an example of an embodiment, there is provided, for example, a method for use in a communication network control element or function of a communication cell configured to communicate with a communication element or function in a communication network comprising a plurality of communication cells, the method comprising participating in a handover procedure for changing a communication connection of the communication element or function from a source cell currently serving the communication element or function to a target cell; obtaining and processing, when the handover is successfully completed, beam information indicating a communication beam of the source cell serving the communication element or function at the time when the handover procedure is executed; and causing forwarding the beam information to a communication network control element or function of the source cell.

According to further refinements, these examples may include one or more of the following features:

the beam information may be received in a handover confirmation signaling from the communication element or function;

as part of the beam information, an indication of a communication beam of the target cell on which the communication element or function successfully accessed the target cell when conducting the handover procedure may be obtained, wherein the indication of a communication beam of the target cell on which the communication element or function successfully accessed the target cell may be received from the communication element or function, or is determined in the communication network control element or function of the target cell;

the communication network control element or function may comprise a central unit and at least one distributed unit, the beam information may be obtained at least in part by the at least one distributed unit and forwarded to the central unit, and forwarding of the beam information to the communication network control element or function of the source cell may be caused by the central unit;

forwarding the beam information to the communication network control element or function of the source cell in a context release signaling may be caused via a dedicated interface between communication network control elements or functions of the source cell and the target cell;

In addition, according to an example of an embodiment, there is provided, for example, an apparatus for use by a communication network control element or function of a communication cell configured to communicate with a communication element or function in a communication network comprising a plurality of communication cells, the apparatus comprising at least one processing circuitry, and at least one memory for storing instructions to be executed by the processing circuitry, wherein the at least one memory and the instructions are configured to, with the at least one processing circuitry, cause the apparatus at least: to establish a communication connection to a communication element or function after a handover procedure for changing a communication connection of the communication element or function from a source cell to a target cell is failed; and to obtain and process beam information from the communication element or function indicating a communication beam of the source cell serving the communication element or function at the time when the handover procedure is executed.

Furthermore, according to an example of an embodiment, there is provided, for example, a method for use in a communication network control element or function of a communication cell configured to communicate with a communication element or function in a communication network comprising a plurality of communication cells, the method comprising establishing a communication connection to a communication element or function after a handover procedure for changing a communication connection of the communication element or function from a source cell to a target cell is failed; and obtaining and processing beam information from the communication element or function indicating a communication beam of the source cell serving the communication element or function at the time when the handover procedure is executed.

According to further refinements, these examples may include one or more of the following features:
- the beam information may further include an indication of a communication beam of the target cell to which the handover failed;
- In case the communication connection to the communication element or function is re-established to the source cell, the beam information may be processed by using it for generating handover supporting information indicating at least one preferred communication beam per candidate target cell for a handover in relation to a communication beam of the source cell serving the communication element or function at the time of conducting the handover procedure;
- in case the communication connection to the communication element or function is re-established to the communication cell being different to the source cell, the beam information may be processed by causing forwarding the beam information to the communication network control element or function of the source cell;

In addition, according to an example of an embodiment, there is provided, for example, an apparatus for use by a communication network control element or function of a communication cell configured to communicate with a communication element or function in a communication network comprising a plurality of communication cells, the apparatus comprising at least one processing circuitry, and at least one memory for storing instructions to be executed by the processing circuitry, wherein the at least one memory and the instructions are configured to, with the at least one processing circuitry, cause the apparatus at least: to conduct a handover procedure for changing a communication connection of the communication element or function from a source cell currently serving the communication element or function to a target cell; to obtain and process, when the handover procedure is ended, beam information indicating communication beams involved in the handover procedure on a side of the source cell and on a side of the target cell; to process the beam information for evaluating properties of communication cells being candidates for handover procedure on a communication beam level; and to generate handover support information on the basis of the processed beam information, the handover supporting information indicating at least one preferred communication beam per candidate target cell for a handover in relation to a communication beam of the source cell serving the communication element or function at the time of conducting the handover procedure.

Furthermore, according to an example of an embodiment, there is provided, for example, a method for use in a communication network control element or function of a communication cell configured to communicate with a communication element or function in a communication network comprising a plurality of communication cells, the method comprising conducting a handover procedure for changing a communication connection of the communication element or function from a source cell currently serving the communication element or function to a target cell; obtaining and processing, when the handover procedure is ended, beam information indicating communication beams involved in the handover procedure on a side of the source cell and on a side of the target cell; processing the beam information for evaluating properties of communication cells being candidates for handover procedure on a communication beam level; and generating handover support information on the basis of the processed beam information, the handover supporting information indicating at least one preferred communication beam per candidate target cell for a handover in relation to a communication beam of the source cell serving the communication element or function at the time of conducting the handover procedure.

According to further refinements, these examples may include one or more of the following features:
- in case the handover procedure is completed successfully by connecting the communication element or function to the target cell, the beam information may be received from a communication network control element or function of the target cell in a context release signaling via a dedicated interface between communication network control elements or functions of the source cell and the target cell, and the beam information may comprise an indication of the communication beam of the source cell serving the communication element or function at the time when the handover procedure is executed, and an indication of the communication beam of the target cell on which the communication element or function successfully accessed the target cell when conducting the handover procedure;
- in case the handover procedure to the target cell failed, the beam information may be obtained from a communication network control element or function of a communication cell to which the communication element established a communication connection, and the beam information may comprise an indication of the communication beam of the source cell serving the communication element or function at the time when the handover procedure is executed, and an indication of the communication beam of the target cell to which the handover failed;
- the communication network control element or function may comprise a central unit and at least one distributed unit, at least a part of the beam information may be obtained by the at least one distributed unit and forwarded to the central unit for indicating the communication beam of the source cell serving the communication element or function at the time when the handover procedure is executed, and the beam information may be processed by the central unit;
- for generating the handover support information on the basis of the processed beam information, results of handover procedures between at least one communication beam of the source cell to at least one communication beam of at least one target cell may be reflected, wherein the results may indicate at least one of a number of successful handover procedures and a number of failed handover procedures;

for generating the handover support information, measurement results related to a communication quality of communication beams of neighboring communication cells may be considered;

sending of the handover supporting information to a communication element or function executing a handover procedure to a target cell in a handover command signaling to the communication element or function may be caused;

in the handover supporting information caused to be sent to the communication element or function, information related to candidate target cells being reported to be receivable by the communication element or function may be considered.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which:

FIGS. 8a and 8b show examples of handover result related tables according to examples of embodiments;

DESCRIPTION OF EMBODIMENTS

Figure 1:
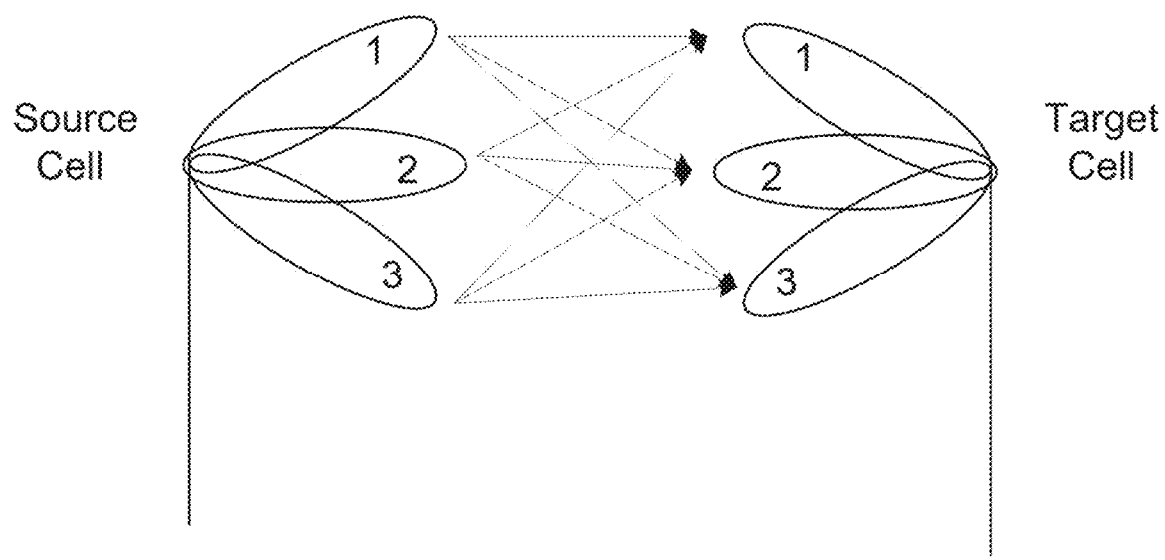
FIG. 1 shows a diagram illustrating a beam based mobility scenario where examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on LTE or LTE-A, fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Generally, for properly establishing and handling a communication between two or more end points (e.g. communication stations or elements, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

Next-generation (also referred to as 5G) networks will provide significant improvements for achieving a fully mobile and connected society. A variety of new use cases and business models is under discussion as being available for customers. For example, 5G networks will provide services capable for eMBB (enhanced Mobile Broadband) mMTC (massive Machine Type Communications) and URLLC (Ultra-Reliable and Low Latency Communications), which have differing requirements for resources.

When a communication element or function, such as a UE, is moving within the network, or in case communication conditions like load or connection quality change, it may become necessary that the communication element or function switches the communication connection from one access point or cell to another (neighboring) access point or cell. This switching or changing of the communication connection is referred to as handover, wherein the processing conducted for such a handover is referred to hereinafter as handover (HO) procedure.

As one example, a HO procedure is performed by the UE when running out of coverage of the current cell (the current cell is referred to also as source cell). According to some examples, the HO procedure is network driven and assisted by the UE, e.g. on the basis of signal or connection quality related measurement in the current serving cell (the source cell) and candidate cells for a HO (also referred to as target cell(s)). Such measurement can be based, for example, on specific signals, like RSRP measurements of the serving and target cell(s)).

Next-generation communication system can use different access resources. For example, in NR, mmW frequencies are employed wherein a cell is composed of multiple communication beams (referred to hereinafter as beams) formed by specific antenna configurations or the like.

FIG. 1 shows a diagram illustrating a beam based mobility scenario where examples of embodiments are implementable. As indicated in FIG. 1, it is assumed that a cell (in FIG. 1, a source cell as a cell currently serving a UE, and a target cell to which HO procedure of a UE is executed are shown, wherein the number of cells indicated in FIG. 1 is merely a simplified example for illustrative purposes) comprises a plurality (or at least one) of beams 1, 2 and 3, each of which may have similar or different properties, wherein the coverage areas of the respective beams may be overlapping or separate from each other. When a UE (not shown in FIG. 1) is moving e.g. from the source cell towards the target cell and a HO condition is fulfilled (e.g. certain thresholds for connection quality to the source/target cell are met), the connection is not only switched from the source cell to the target cell, but also from one or more of the (currently serving) beam(s) in the source cell to one or more of the beams in the target cell (indicated by arrows directed to the respective beams 1 to 3 of the target cell). That is, a UE is served by a specific beam at each moment of time.

According to examples of communication systems, beam mobility within a cell is handled by specific layers of a protocol stack. For example, beam mobility is handled in lower layers, such as at Physical and MAC sublayer, and are transparent for higher layers. For example, in current cellular communication systems based on 3GPP standards, when beam operations are used, the HO is triggered at Layer 3 by using cell quality measurements of the source and target cell. Nevertheless, the UE is served by one beam in the source cell and after the HO will be served by one beam in the target cell.

5G introduces an architecture for which the different sublayers of the RAN are split into two logical entities in a communication network control element or function (like a BS or gNB), which are referred to as distributed unit (DU) and central unit (CU). For example, the CU is a logical node that functions (e.g. of gNB) like transfer of user data, mobility control, radio access network sharing, positioning, session management etc., (except functions which are allocated to the DU). The CU controls the operation of one or more DUs over a front-haul interface (referred to as F1 interface). On the other hand, one or more DUs is/are provided in communication network control element or function (e.g. gNB). The DU is a logical node including a subset of the gNB functions, depending on the functional split option. For example, MAC sublayer and Physical layer are located in the DU. On the other hand, RLC, PDCP, SDAP and RLC layer are located in the CU.

However, since the management of beams is handled at physical and MAC layer, higher layers like layer 3 (network layer) may not have information regarding which beam is currently used for the UE (i.e. which beam serves the UE). For example, in case of the split configuration of CU/DU indicated above, the CU has no information about which beam is currently used to serve the UE.

This may have some impact on how HO is performed/prepared. For example, for mobility optimization, it may be desirable to consider not only cell level information and settings but also at beam level information and settings. That is, according to examples of embodiments, a communication connection control procedure is provided where parameters and processing are based on optimized parameters to be used for a HO procedure allowing to consider a controlled switching from a beam of a source cell to a beam of a target cell.

In the following, different exemplifying embodiments will be described using, as an example of a communication network to which examples of embodiments may be applied, a communication network architecture based on 3GPP standards for 5G communication networks, without restricting the embodiments to such architectures, however. It is obvious for a person skilled in the art that the embodiments may also be applied to other kinds of communication networks having suitable means by adjusting parameters and procedures appropriately, e.g. 4G networks, Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the invention can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as an AMF, an UPF, a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

Figure 2:
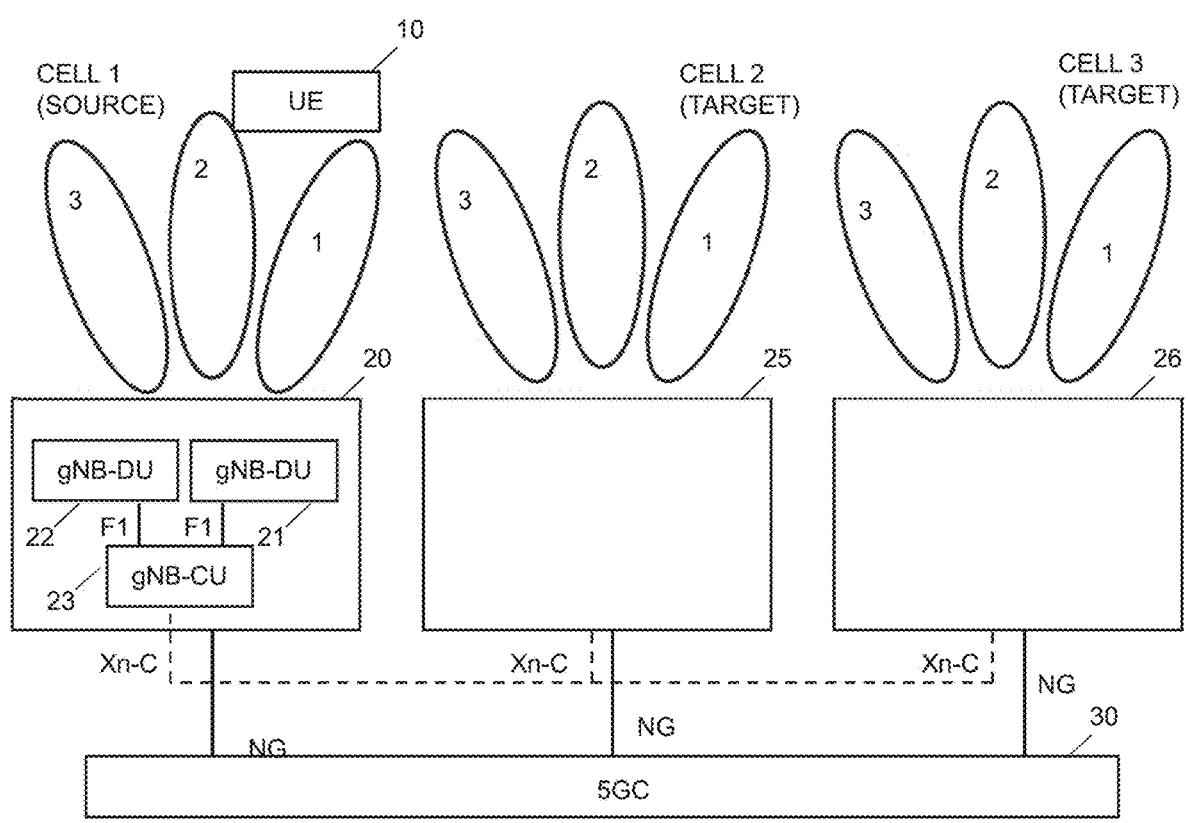
FIG. 2 shows a diagram of a communication network example where examples of embodiments are implementable.

FIG. 2 shows a diagram of a communication network example where examples of embodiments are implementable;

As shown in FIG. 2, a communication element such as a user equipment (UE) 10 is connected to a cell 1, i.e. the communication network control element or function of the cell 1, such as a gNB 20, via a communication beam of the cell 1 (e.g. beam 1 of beams 1 to 3 of cell 1), In the example shown in FIG. 1, the gNB 20 is provided with a CU 23 and two DUs 21 and 22 being connected to the CU 23 by a F1 interface.

Furthermore, as shown in the example of FIG. 2, there is a plurality of further cells (in FIG. 1, for illustrative purposes, two cells, i.e. cell 2 and cell 3 are shown) to which the UE 10 can connect, e.g. by executing a HO procedure. That is, cells 2 and 3 are target cells for a HO while cell 1 currently serving the UE 10 is the source cell for the HO. In detail, cell 2 is controlled by a communication network control element or function, such as gNB 25, and provides a plurality of beams 1 to 3, and cell 2 is controlled by a communication network control element or function, such as gNB 27, and provides a plurality of beams 1 to 3.

It is to be noted that the gNBs 25 and 27 may have a similar configuration like that shown for gNB 20, i.e. provided with CU and DU. However, examples of embodiments are also implementable when one or more (or all) of the communication network control elements or functions used for controlling the respective cells (i.e. cells 1 to 3) have another configuration, which may be referred to also as "flat" configuration, without splitting into CU and DU.

As shown in FIG. 2, each communication network control element or function of the cells is connected to a core network, such as a 5GC, via respective interfaces, indicated as NG interfaces. Furthermore, the communication network control element or function of the cells, such as gNB 20, gNB 25 and gNB 27, are connected with each other by means of a specific interface, which is referred to e.g. as an Xn-C interface.

In the following, examples related to a HO processing when a communication element or function, such as the UE 10, switches the communication connection to another cell (e.g. from the source cell 1 to target cell 2) will be described for illustrating examples of embodiments of the invention. It is to be noted that the described examples (e.g. inter gNB HO scenarios) are only for illustrative purposes and do not limit applications of examples of embodiments. That is, for example, processing for HO according to examples of embodiments is also applicable to other HO related scenarios besides those described in the following, for example for HO in roaming scenarios.

When conducting a HO for UE 10 in a communication network environment such as that shown in FIG. 2, the UE 10 sends, for example, an event based measurement report to the communication network control element or function of the cell to which the UE 10 is currently connected, i.e. the serving gNB 20 which controls the source cell 1. In the example illustrated in FIG. 2, since the gNB 20 has a configuration including DU and CU, corresponding reports are sent to the CU part of gNB 20.

For example, the report includes information related to the cell quality, beam measurement results, and/or beam IDs of communication beams in the source and target cells which are receivable (i.e. measurable) by the UE 10.

However, as indicated above, the higher layers of the CU such as the RRC layer in the CU part of the gNB 20 do not know which beam serves the UE when the measurement report is sent. For example, due to filtering and TTT, a delay for transmitting the measurement request (MR) or separate measurement configurations for L2 and L3, one cannot assume that the best beam in the measurement report is the beam that served the UE when the measurement report was sent.

When conducting the HO procedure, the communication network control element or function of the serving cell, i.e. gNB 20, sends a HO command to the UE 10. The HO command contains, for example, information regarding resources to be used in the HO, such as a list of dedicated RACH resources corresponding to different beams in the target cell. Details on how and on which target cell beam the UE will try to access the target cell, i.e. which RACH resource is actually used, have been so far left up to UE implementation. Thus, conventionally, the source cell does not know on which beam of the target cell the UE has actually performed an access, i.e. used RACH resources. For example, it is possible that the UE has chosen the cell itself when a list of beam is given.

It is possible that the communication network control element or function of the serving cell, such as the gNB 20, provides information indicating a relation to neighboring cells, wherein IDs allowing to identify the respective cell are included. For example, the gNB builds a NRT (neighbour relation table) for each cell. In this table, for each source cell, the possible target cells are listed with related information such as the network address of the target cell (i.e. the communication network control element or function thereof, e.g. gNB 25 or 27).

For optimizing the quality of HO processes, different additional features are considered. One of these features is the so-called mobility robustness optimization (MRO). MRO is a SON feature for automatic detection and correction of errors in the mobility configuration allowing to optimize the quality of HO handover process. For example, the CIO between two cells can be modified to cope with the problem of too early or too late handover. Late handover means that the UE does not receive the HO command, e.g. due to weak signal, e.g. since the UE is moving faster than the HO parameter settings allow. The HO command does not reach the UE (already located in the target cell) so that connection is lost. By using information from the target cell, HO parameters can be adjusted. On the other hand, handover too early means that the signal strength in the target cell is too weak, and the connection is lost almost immediately.

According to examples of embodiments, it is now considered that in contrast to conventional approaches, HO is triggered not only on a cell to cell basis. Rather, according to examples of embodiments, information regarding the beams involved in the connection of the UE conducting a HO, such as the beam serving a UE in the source cell and then the beam of the target cell to which the UE accesses in the HO, is considered. That is, regarding the beam serving the UE in the source cell, the beam is meant which served the UE at the moment the UE physically stops a communication with the source cell and performs the access (RACH based, for example) to the target cell. For example, according to examples of embodiments, features like MRO are executed not only on a cell pair basis but also on a beam pair basis.

Furthermore, according to examples of embodiments, mechanisms are provided allowing to inform each part of the network about the necessary information. That is, for example, that in a CU/DU architecture, the HO deciding layer which is located in the CU is provided with information allowing to identify which beam the UE is served on, wherein this information resides usually in the DU.

As a consequence, according to examples of embodiments, it is possible that the network (e.g. the communication network control element or function being involved in the HO procedure) can tailor the HO procedure such that the target beam is selected based on the source beam (i.e. the beam serving the UE at the moment the UE is going to physically stop the communication with the source cell and to perform the access (RACH based, for example) to the target cell). Examples of embodiments are applicable to each sort of architecture of the communication network control element or function being involved in the HO procedure, i.e. of a gNB or another base station or the like, irrespective of whether a configuration using a CU/DU architecture as discussed above is used. Even if in such a case it is possible that the communication network control element or function of the source cell and being involved in the HO procedure knows the serving beam, examples of embodiments allow to provide and process information for identifying beams of the target cell on which beam the UE has accessed the target cell.

Figure 3:
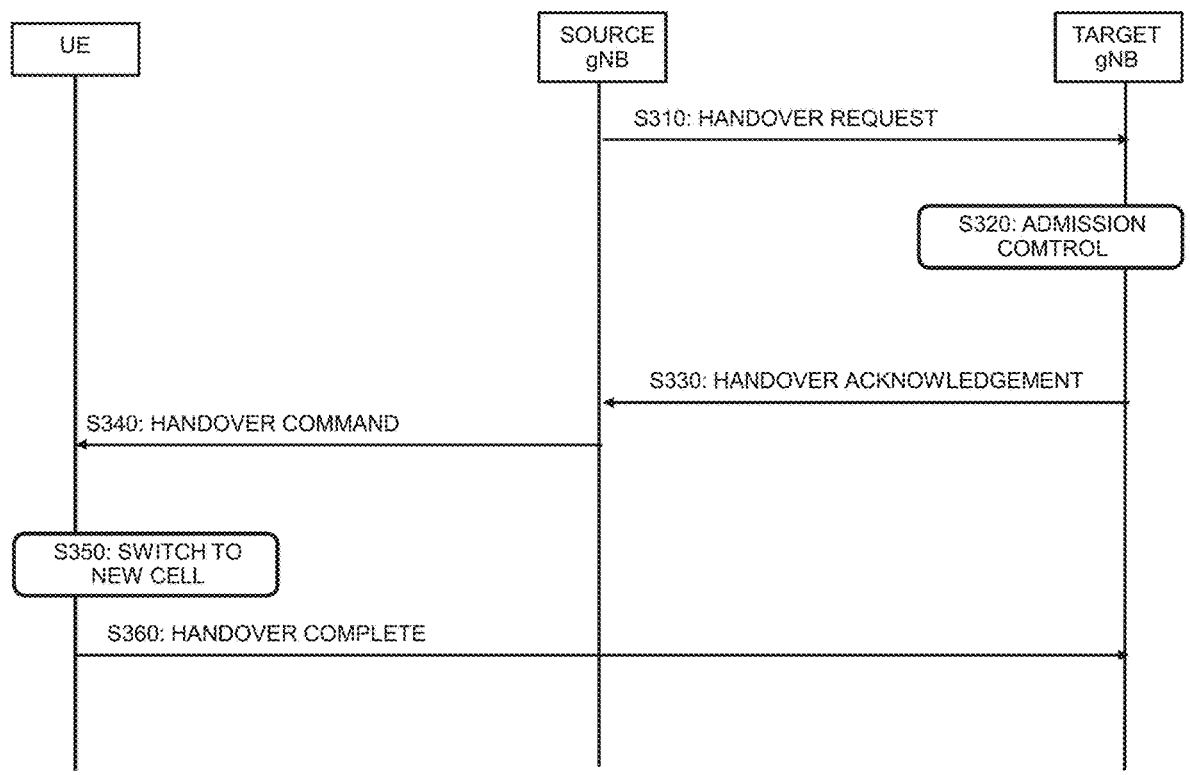
FIG. 3 shows a signaling diagram illustrating a processing for a handover processing where examples of embodiments are applicable.

FIG. 3 shows a signaling diagram illustrating a processing for a handover processing where examples of embodiments are applicable. In detail, FIG. 3 shows a signalling message flow in case of a 5G based system (e.g. like that shown in FIG. 2) where a an inter-gNB handover is conducted. The processing described in connection with FIG. 3 represents one possible starting point for procedures related to a HO control according to examples of embodiments.

In S310, the source gNB initiates HO and issues a HO Request over the Xn interface to the target gNB.

In S320, the target gNB performs admission control. Then, in S330, the target gNB provides RRC configuration as part of a HO acknowledgement message.

In S340, the source gNB sends a HO command to the UE in which it provides the RRC configuration. The HO Command message includes at least cell ID and all information required to access the target cell so that the UE can access the target cell without reading system information. The access information to the target cell may include beam specific information.

In S350, the UE moves the RRC connection to the target gNB. Then, in S360, the UE replies the HO complete message.

Figure 4:
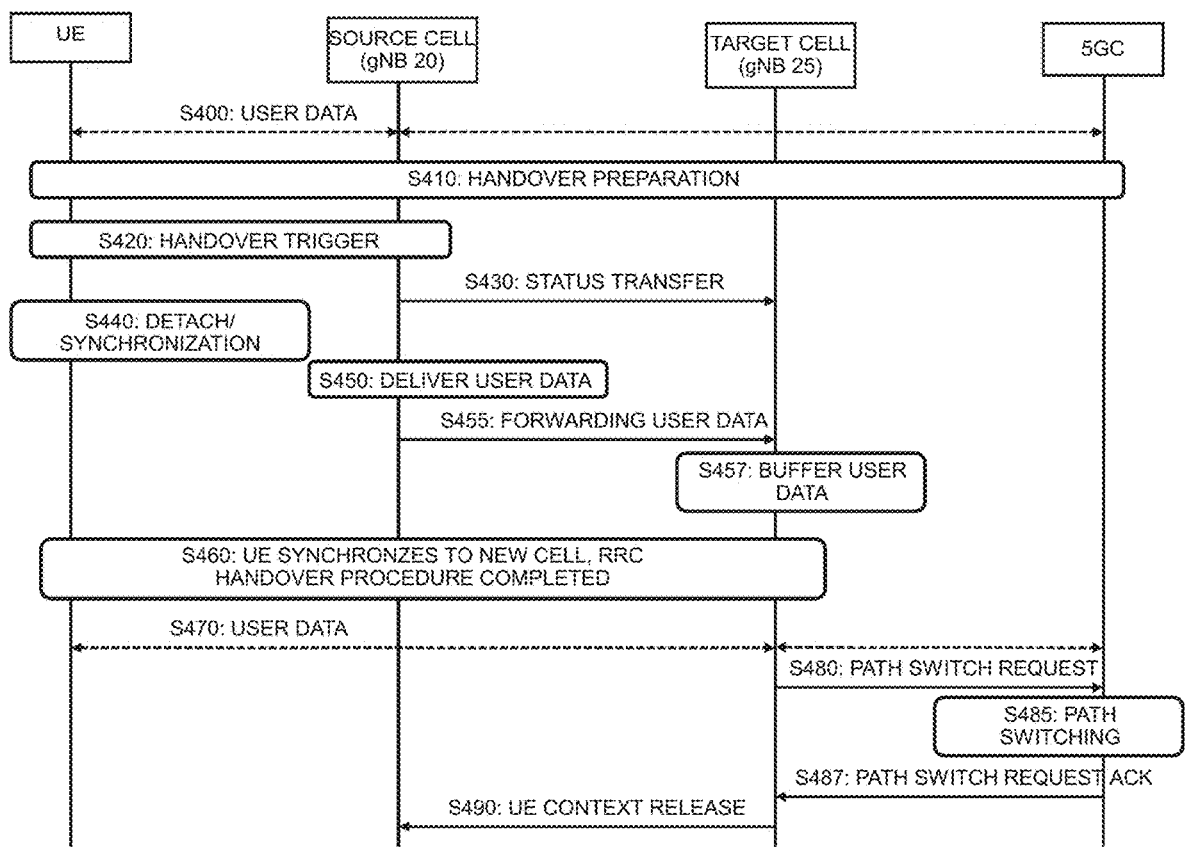
FIG. 4 shows a signaling diagram illustrating a processing for a handover processing where examples of embodiments are applicable.

FIG. 4 shows a further signaling diagram illustrating additional details of a handover processing where examples of embodiments are applicable. Specifically, FIG. 4 shows a handover procedure between two gNBs (e.g. gNB 20 and gNB 25 of FIG. 2) wherein core network elements or functions, such as an AMF or UPF, remain unchanged (intra-AMF/UPF handover). It is to be noted that the example in FIG. 4 is to be used only for explaining principles of examples of embodiments, which are applicable also to other HO scenarios. That is, the processing described in connection with FIG. 4 represents a scenario in which aspects of a HO control according to examples of embodiments are implementable.

In S400, user data are communicated in the network to and from the UE via the core network (e.g. AMF, UPF) and the source cell.

In S410, preparation of a handover execution is executed. It is to be noted that processing in S410 represents a start of a handover, e.g. when a UE sends a measurement message to the source cell (e.g. gNB 20), and the handover is executed when the UE actually leaves the source cell (i.e. switches the connection from the source cell). The handover preparation comprises, for example, that mobility control information is provided by the core network, e.g. the AMF, that the source gNB 20 configures UE measurement procedures and UE reports according to the measurement configuration, that the source gNB 20 decides to handover the UE, e.g. based on measurement report information, and that the source gNB 20 issues a HO request message to the target gNB 25 passing necessary information to prepare the handover at the target side (e.g. target cell ID, identifier of the UE in the source gNB 20, RRM-configuration of the UE, UE capabilities for different RATs, and the like). Furthermore, the target gNB 25 conducts admission control, prepares the handover with L1/L2 and sends a HO request acknowledgement to the source gNB 20.

In S420, the source gNB 20 triggers the HO (Uu handover) and sends the HO command message to the UE 10. The HO command message carries the information required to access the target cell (e.g. the target cell ID, information about dedicated RACH resources).

In 430, the source gNB 20 sends a status transfer message to the target gNB 25. Furthermore, in S440, the UE 10 begins to detach from the old cell and to synchronize to the new cell (in other words, the handover is executed). In S450, the source gNB 20 delivers user data to the target gNB 25, which are forwarded in S455. In S457, the target gNB buffers the user data received from the source gNB 20.

In S460, the UE 10 synchronizes to the target cell and completes the RRC handover procedure. Then, the target gNB 25 sends a path switch request to the 5GC 30 (e.g. the AMF) to trigger the 5GC 30 to switch the DL data path towards the target gNB 25 and to establish an NG interface instance towards the target gNB 25.

In S485, the 5GC 30 switches the DL data path towards the target gNB 25. Then, in S487, the core network side, e.g. the AMF, confirms the path switch request with a path switch acknowledgement message.

In S490, the target gNB 25 sends a UE context release message to the source gNB 20. By sending the context release message, the target gNB 25 informs the source gNB 20 about the success of the HO and triggers the release of resources by the source gNB 20. Upon reception of the UE context release message, the source gNB 20 can release radio and control plane related resources associated to the UE context.

As indicated above, information indicating relations to neighbouring cells can be provided by communication network control elements or functions in order to support HO. For example, information like a NRT are used. For each cell that the communication network control element or function has, it keeps a NRT. The NRT contains identifiers of the target cell (TCI), like cell global identifier and physical cell identifier (PCI) of the target cell. Furthermore, each NR may have attributes, such as a NoRemove attribute for indicating that the neighbor cell relation is not to be removed from the NRT, a NoHO attribute for indicating that the relation is not to be used for handover reasons, and a NoX2 attribute for indicating that an X2 interface is not to be used for initiating a procedures at the target cell. Neighbour cell relations are cell-to-cell relations, while an X2 link is set up between two communication network control elements or functions, such as two gNBs.

As described above, according to examples of embodiments, for controlling a HO according to examples of embodiments, beam information is provided. Specifically, according to examples of embodiments, information related to the beam serving the UE at the time of the HO in the source cell (i.e. the moment when the UE physically stops a communication with the source cell and performs the access (RACH based, for example) to the target cell) and information related to the beam which is used by the UE for connecting to the target cell are obtained and processed.

Specifically, according to examples of embodiments, measures for collecting information about beams in case of a successful handover but also in case of a failed handover are proposed.

For example, according to examples of embodiments, source and target cell beam indications are provided by the UE after the HO is ended successfully. For example, for the purpose of MRO, after a successful HO, the UE indicates which was the serving beam at the source cell when the UE executes the HO. Furthermore, the UE also indicates the beam on which the UE performed a successful access to the target cell using e.g. RACH. Alternatively, this information related to the target cell beam used for accessing the target cell can also be obtained in the target cell itself, e.g. in the communication network control element or function like the gNB 25. The beam information, i.e. the indication of the serving beam in the source cell and the indication of the beam of the target cell are provided to the communication network control element or function of the target cell. In case the communication network control element or function of the target cell is configured by a CU and one or more DUs, the beam information are provided to the CU of the communication network control element or function of the target cell, wherein the indication of the target cell beam to which the UE accessed can be provided by the DU of the target cell gNB, for example. When the beam information is collected on the target cell side, it is forwarded to the communication network control element or function of the source cell (e.g. gNB 20) via a corresponding interface (e.g. the Xn interface shown in FIG. 2). In case the communication network control element or function of the source cell is configured by a CU and one or more DUs, the beam information are provided to the CU of the communication network control element or function of the source cell.

It is to be noted that the last served beam in the source cell could be defined as the beam used to send e.g. a HO command message. However, in case of a multi-connectivity connection, the HO command message may be sent over another leg or sent via two legs. Therefore, according to examples of embodiments, different formats for indicating the last served beam are conceivable; for example, the beam used for sending the HO command is indicated, or a plurality or all of the beams to which the UE is connected at the time of the HO is indicated as last served beam(s), in case of a multi-connectivity connection.

Furthermore, according to examples of embodiments, it is also possible to obtain at least the indication of the serving beam on the source cell side by communication network control element or function of the source cell, e.g. the gNB 20. That is, the beam information containing the indication of the source cell beam serving the UE when executing the HO is provided by the source cell communication network control element or function after HO. For example, in case the communication network control element or function of the source cell is configured by a CU and one or more DUs, the beam information is provided to the CU of the communication network control element or function of the source cell triggering the HO (e.g. CU 23 of gNB 20) by the DU of the communication network control element or function of the source cell (e.g. the DU 21 of the gNB 20).

Moreover, according to examples of embodiments, also in case of a handover failure, source and target cell beam indications are provided to the communication network control element or function of the source cell. When a HO failure occurs, the UE indicates the serving beam at the source cell at the moment of the HO failure (i.e. when the HO procedure is executed) and the beam of the target cell to which the HO was attempted. The beam information, i.e. the indication of the serving beam in the source cell and the indication of the beam of the target cell, is provided to the communication network control element or function of a cell to which a connection is (re-)established after the HO failure to the target cell. That is, the now connected cell (also referred to as recovery cell) can be again the source cell or another cell. In the latter case, the beam information is forwarded to the communication network control element or function of the source cell (e.g. gNB 20) via a corresponding interface (e.g. the Xn interface shown in FIG. 2). In case the recovery cell is the source cell, the beam information is obtained from the UE and optionally from the communication network control element or function of the source cell itself (e.g. in case the communication network control element or function of the source cell is configured by a CU and one or more DUs, the beam information is provided to the CU of the communication network control element or function of the source cell from a DU thereof).

According to further examples of embodiments, when the beam information are provided to the communication network control element or function of the source cell, the communication network control element or function of the source cell (e.g. gNB 20, CU 23) is able to collect data about the HO performance, such as information indicating its success or its failure (like numbers of successful or failed HO attempts, probability values related to successful or failed HO, etc.). In these data about the HO performance, the source and target beams involved in each HO procedure are taken into account. On the basis of the collected data, the source cell is able to build, for example, a table or map which reflects the HO performance between beams of the source cell and the candidate target cells, such as the most probable and the most successful combinations of source and target beams. This map or table can be used for overall improvement of the HO processing of UEs in the source cell.

Moreover according to further examples of embodiments, it is possible to provide a beam dependent HO command. For example, in the HO command message issued by the communication network control element or function of the source cell (e.g. gNB 20), the network can indicate detailed information regarding the HO procedure to be conducted by a UE. For example, it is possible to provide information indicating a mapping between different beam targets (i.e. which combination of source cell beam and target cell beam is probably the most successful). Furthermore, also different orders of preferred beam targets can be provided. The information is based, for example, on the beam which is currently serving the UE in the source cell at the time the HO is executed.

In the following, further details of examples of embodiments are described with reference to the diagrams according to FIGS. 5 to 9.

Figure 5:
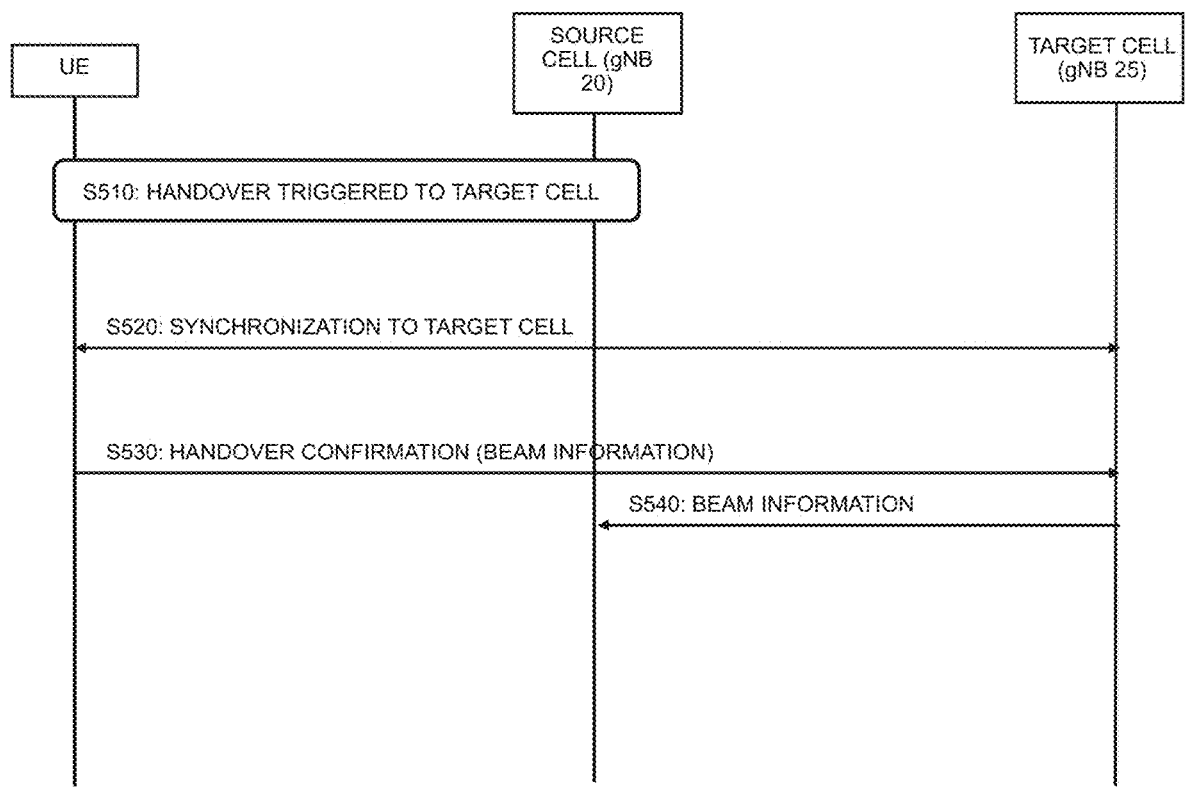
FIG. 5 shows a signaling diagram illustrating a processing according to examples of embodiments.

FIG. 5 shows a signaling diagram illustrating a processing according to examples of embodiments and concerning a collection of information about the successful and failed handover. Specifically, in FIG. 5, an example is described where the HO from a source cell (e.g. cell 1 in FIG. 2) to a target cell (e.g. cell 2 in FIG. 2) is successfully completed by UE 10. Thus, as described above, beam information indicating the involved source and target beams is provided to the source cell.

As shown in FIG. 5, in S510, the HO to the target cell 2 is triggered between the source cell and the UE 10, as described above, for example. In S520, the UE 10 synchronizes with the target cell, e.g. by executing an access procedure using RACH. As a result, the UE 10 is connected to the target cell (i.e. gNB 25).

In S530, the UE 10 sends a HO confirmation message to the target cell. According to examples of embodiments, in this HO complete message, the UE 10 provides beam information to the target cell. For example, the UE 10 indicates which was the serving beam in the source cell at the moment of the handover to the target cell (e.g. a beam ID or the like). When the gNB 25 comprises a CU/DU configuration as described above, the beam information is sent from the UE 10 to target cell gNB-DU which relays this information to the target cell gNB-CU.

As indicated above, the beam information obtained by the target cell gNB comprises also an indication (e.g. a beam ID) of the beam to which the UE 10 accessed the target cell (i.e. executed the RACH processing). This target cell beam related information can be provided by the UE 10 or obtained from the gNB 25 itself (e.g. from the DU of gNB 25).

In S540, the beam information which are relayed to the target cell gNB 25 is forwarded to the source cell side, i.e. to the source cell gNB 20 (e.g. to the gNB-CU 23). This is done, for example, by means of a signaling over the Xn interface. As a message for providing the beam information, for example, a UE context release message can be used.

Figure 6:
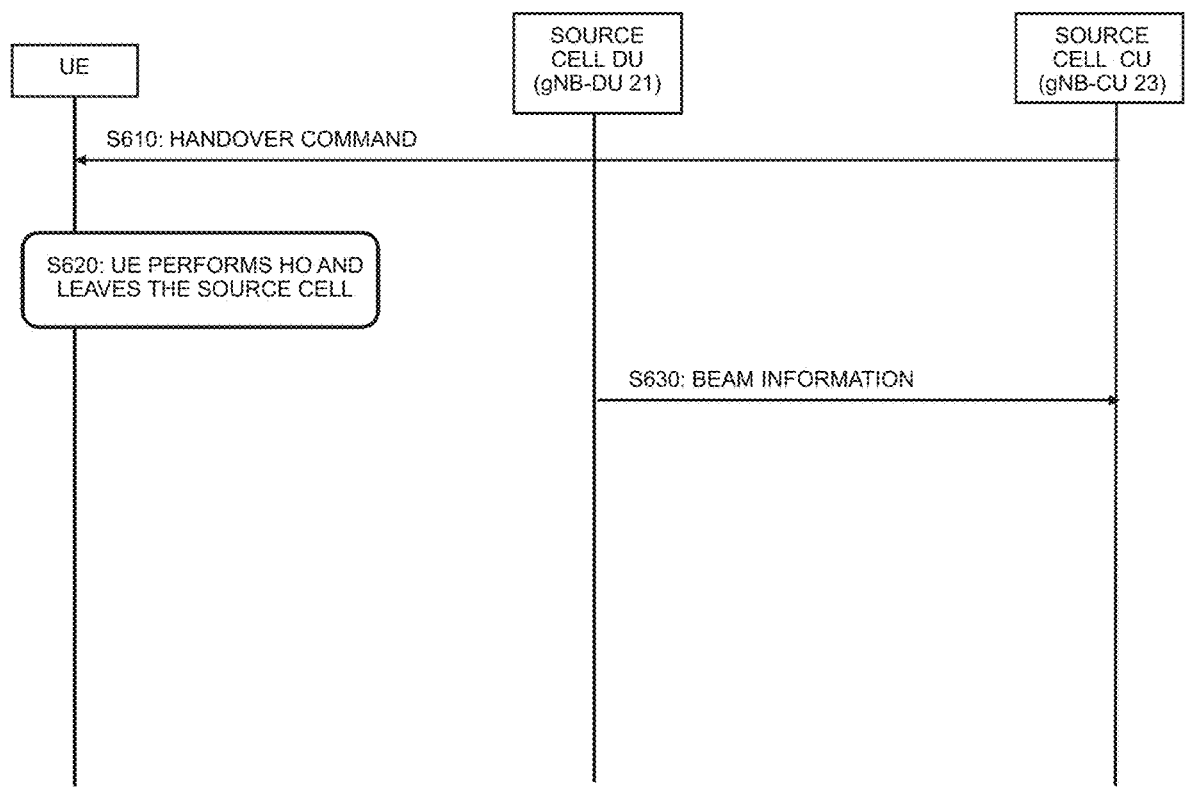
FIG. 6 shows a signaling diagram illustrating a processing according to examples of embodiments.

FIG. 6 shows a further signaling diagram illustrating a processing according to examples of embodiments and concerning a collection of information about the successful and failed handover. Specifically, in FIG. 6, an example is described where the HO from a source cell (e.g. cell 1 in FIG. 2) to a target cell (e.g. cell 2 in FIG. 2) is executed by UE 10 (i.e. it leaves the source cell), and beam information is provided by the source cell node. That is, the communication network control element or function of the source cell has a configuration comprising a CU and one or more DUs, as indicated in FIG. 2 for gNB 20, for example.

In the example shown in FIG. 6, in S610, the HO to the target cell 2 is triggered by sending a HO command from the source cell gNB-CU 23 to the UE 10. According to examples of embodiments, the HO command may indicate a preferred beam in the target cell (e.g. based on collected data related to source and target beams, as described above).

In S620, the UE 10 performs the HO and leaves the source cell. It is to be noted that the result of the HO is not relevant in the present example, i.e. the HO can be successful or failed.

In S630, the gNB-DU (e.g. gNB-DU 21) sends beam information to the gNB-CU 23. For example, the beam information indicates the last served beam of the UE, i.e. the beam that served the UE 10 when the UE 10 executes the HO.

It is to be noted that, as indicated above, the last served beam could be defined as the beam used to send the HO command message. However, in case of a multi-connectivity connection, the HO command message may be sent over another leg or sent via two legs. Therefore, according to examples of embodiments, different formats for indicating the last served beam are conceivable; for example, the beam used for sending the HO command is indicated, or a plurality or all of the beams to which the UE is connected at the time of the HO is indicated as last served beam(s), in case of a multi-connectivity connection.

Figure 7:
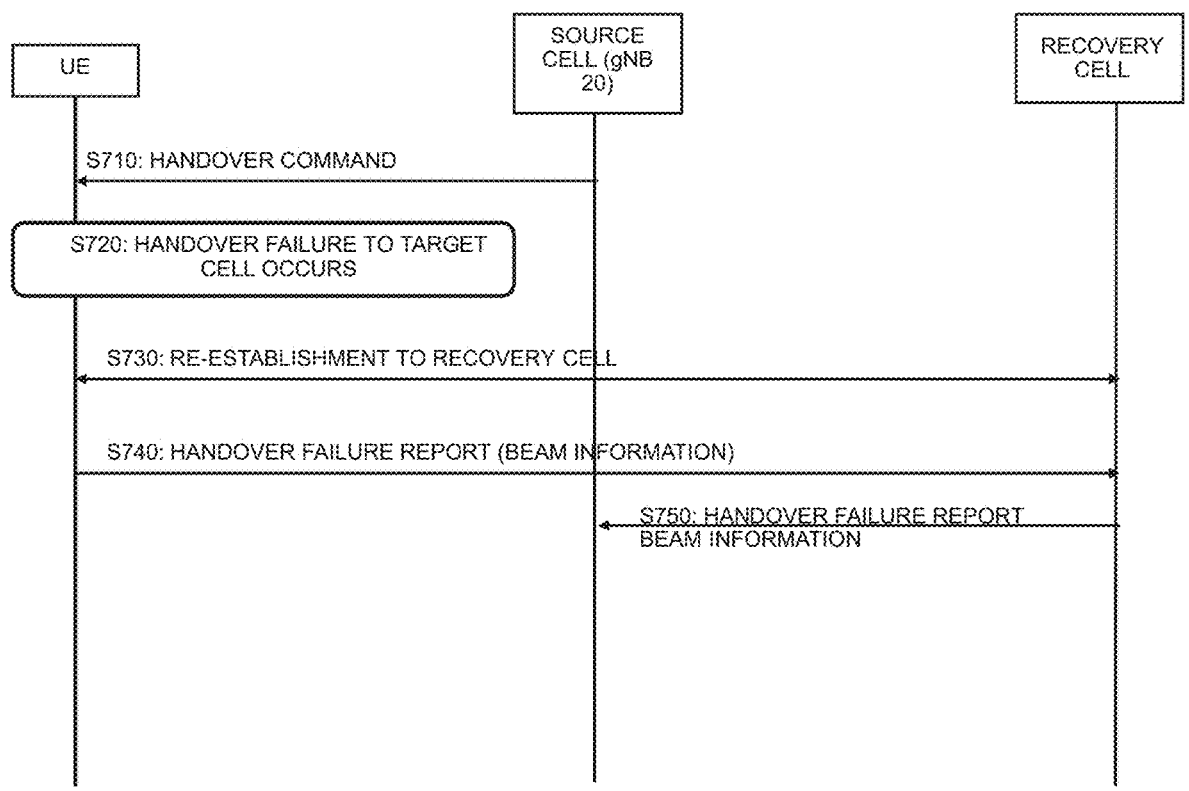
FIG. 7 shows a signaling diagram illustrating a processing according to examples of embodiments.

FIG. 7 shows another signaling diagram illustrating a processing according to examples of embodiments and concerning a collection of information about the successful and failed handover. Specifically, in FIG. 7, an example is described where the HO from a source cell (e.g. cell 1 in FIG. 2) to a target cell (e.g. cell 2 in FIG. 2) failed. As described above, beam information indicating the involved source and target beams is provided to the source cell.

As shown in FIG. 7, in S710, the HO procedure is triggered by the source cell gNB 20 by issuing the HO command to the UE 10, as described above, for example. According to examples of embodiments, the HO command may indicate a preferred beam in the target cell (e.g. based on collected data related to source and target beams, as described above).

In S720, HO failure to the target cell occurs. That is, the UE 10 is not able to connect to the target cell, e.g. since synchronization with the target cell failed.

Due to this HO failure, in S730, the UE 10 re-establishes a connection to another cell, which is referred to as recovery cell. It is to be noted that the recovery cell can be the source cell (i.e. cell 1) or another cell being available (e.g. cell 3).

Next, in S740, the UE sends a HO failure report to the communication network control element or function. In the HO failure report, the UE 10 indicates the source cell and the last served beam in the source cell. Furthermore, the UE 10 indicates on which beam of the target cell the HO failed. It is to be noted that this target cell beam could be the one indicated by the HO command message or chosen by the UE.

In S750, the source cell is informed about the HO failure and the beam information provided by the UE 10 in S740. That is, a HO failure report containing the last served source cell beam and the target cell beam is sent to the source cell for data gathering. It is to be noted that S740 can be omitted in case the recovery cell is the source cell.

As described above, due to the beam information indicating the last served source cell beam and the target cell beam involved in the HO procedure, the source cell (i.e. the communication network control element or function of the source cell, like the gNB 20) is able to gather information and statistics about successful and failed handover procedures on a beam level basis. Thus, it is possible to generate or build tables or the like from which the HO performance can be deduced, That is, it is possible to collect data linked with source cell beam and target cell beam information.

With this information, which is also referred to as handover support information, the communication network control element or function of the source cell (e.g. the gNB-CU 23) controlling the source cell can decide to configure a HO command in such a way that the HO is most likely to succeed wherein the UE can execute an access processing to the target cell using e.g. a RACH processing to the best possible beam in the target cell. As described above, this handover support information can be provided to the UE by means of the HO command.

FIGS. 8a and 8b show examples of handover result related tables according to examples of embodiments. The table in FIG. 8a is related to successful HO results from source cell 1 to neighboring cells 2 and 3 as shown in FIG. 2, wherein for each beam 1 to 3 of source cell 1 the successful results of handovers to beams 1 and 2 of cell 2 and beam 1 of cell 3 are listed. On the other hand, the table in FIG. 8b is related to failed HO results from source cell 1 to neighboring cells 2 and 3 as shown in FIG. 2, wherein again for each beam 1 to 3 of source cell 1 the failed results of handovers to beams 1 and 2 of cell 2 and beam 1 of cell 3 are listed.

It is evident that the examples shown in FIGS. 8a and 8b are only illustrative and that other cells and beams can be considered as well.

From the example shown in FIGS. 8a and 8b, it is possible to deduce that a UE from source cell 1, indicating e.g. cell 2 as possible target for a HO and currently served by beam 1, will be directed to beam 1 in target cell 2, since this combination of serving and target beam has the largest number of recorded successful HOs and the smallest number of failures. Hence, the HO command indicates this combination.

It is to be noted that according to further examples of embodiments, the handover support information can be more precise. For example, tables can be generated which take also into account a best reported beam by the UE in the measurement report. Then, the table is three dimensional, i.e. three parameters can be considered for deciding on which target beam a HO is to be tried. For example, the target beam is decided based on the statistics related to the handover success ratio related to the specific source beam and best measured target beam.

According to further examples of embodiments, it is also possible that the source cell (e.g. gNB 20) use the handover support information to change a threshold related to some specific relation. For example, for a relation cell 1/beam 1→cell 2/beam 1, if there are many HO failures resulting in a recovery that occurs in the target cell/beam, it can be deduced that the HO command may have been triggered too late (i.e. "too late handover" scenario). In this case, the HO could be triggered earlier. One way to do this is to adapt a corresponding threshold leading to start the HO procedure to this target cell.

Figure 9:
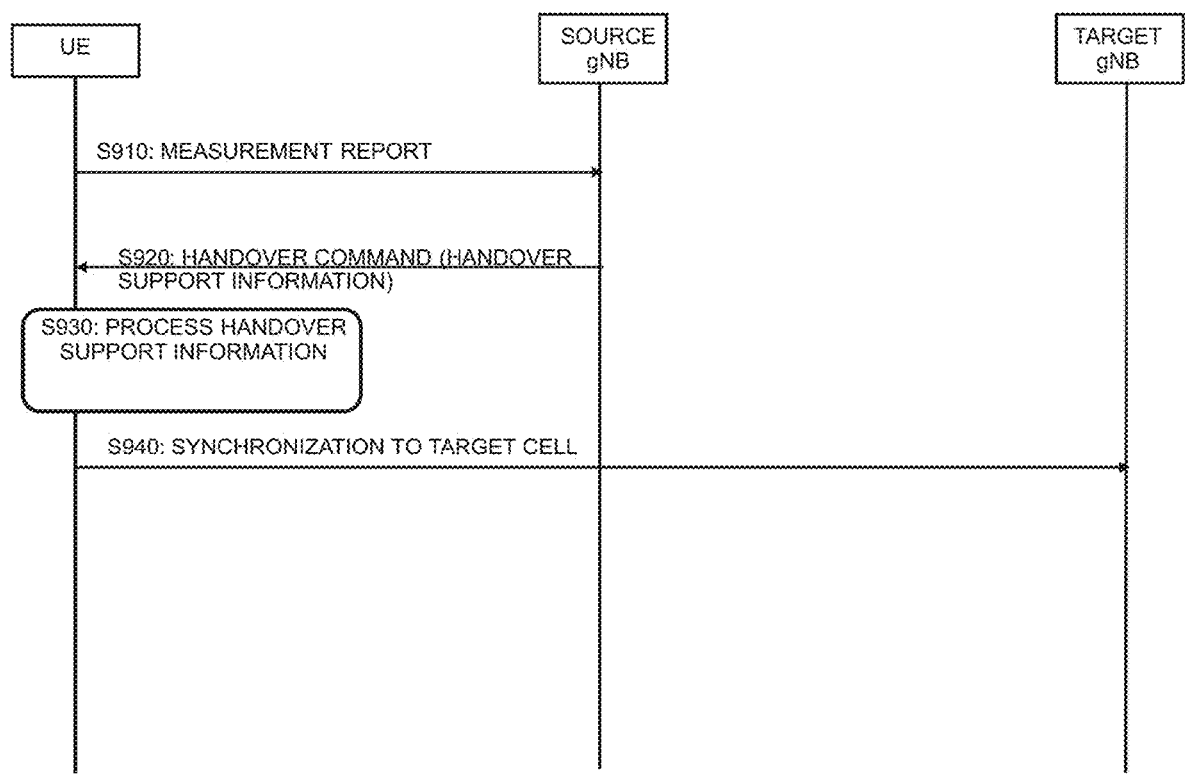
FIG. 9 shows a signaling diagram illustrating a processing according to examples of embodiments.

FIG. 9 shows a signaling diagram illustrating a processing according to examples of embodiments. Specifically, in FIG. 9, an example is described where the HO from a source cell (e.g. cell 1 in FIG. 2) to a target cell (e.g. cell 2 in FIG. 2) is executed by the UE 10 under consideration of beam dependent HO command, i.e. by using handover support information from the source cell being obtained as described above.

In S910, the UE 10 sends a measurement report that includes the measurement on the serving cell beams and target cells beams. Based on this measurement, for example, the source cell (e.g. gNB 20) sends the HO command. The HO command includes handover support information related to a beam level. For example, different configurations depending on the UE's current serving beam are provided.

Based on the example shown in FIGS. 8a and 8b, for example, the information indicate:
  in case the serving source cell beam is beam 1, then the target for the HO to target cell 1 is target cell beam 1,
  in case the serving source cell beam is beam 2, then the target for the HO to target cell 1 is target cell beam 2,
  in case the serving source cell beam is beam 3, then the target for the HO to target cell 2 is target cell beam 1.

On the basis of this information, the UE 10 conducts HO procedure in S930 and synchronizes with the specified cell on the specified beam. For example, considering the above indicated information, in case the UE 10 was served in the source cell 1 by beam 3 it synchronizes with cell2/beam 1.

Figure 10:
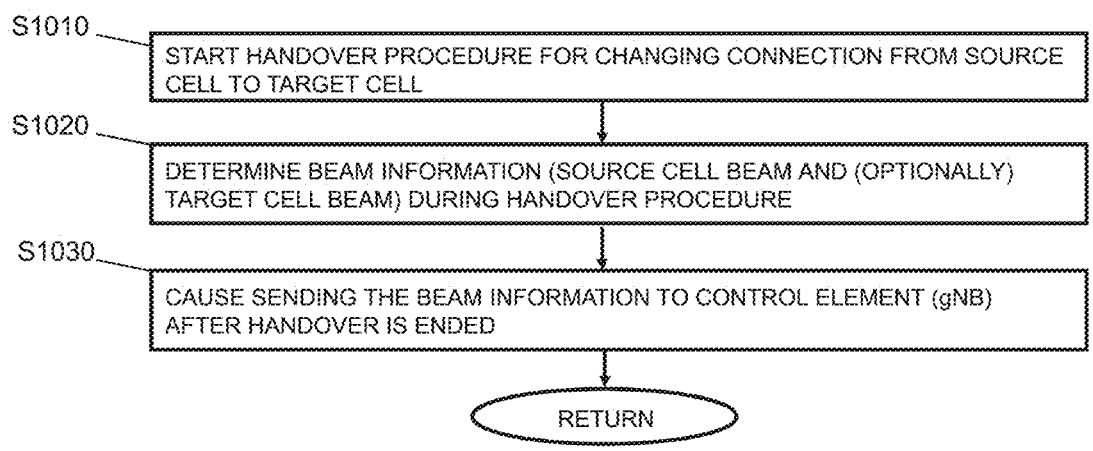
FIG. 10 shows a flow chart of a communication connection control procedure executed by a communication element or function like a UE according to some examples of embodiments.

FIG. 10 shows a flow chart of a communication connection control procedure executed by a communication element or function like a UE according to some examples of embodiments.

In S1010, a handover procedure for changing a communication connection from a source cell currently serving the communication element or function to a target cell is executed.

In S1020, beam information (e.g. beam ID) indicating a communication beam of the source cell serving the communication element or function at the time when the handover procedure is executed is determined.

In S1030, the beam information is sent to a communication network control element or function to which the communication element is connected after the handover procedure is ended. In case the handover procedure is completed successfully by connecting the communication element or function to the intended target cell, the beam information is sent to a communication network control element or function of the target cell. For example, the beam information is sent in a handover confirmation signaling.

According to examples of embodiments, it is possible that the communication element (i.e. the UE) determines also a communication beam of the target cell on which the communication element or function successfully accessed the target cell when conducting the handover procedure. This information is also included in the beam information sent to the communication network control element or function of the target cell, i.e. an indication (beam ID) of the communication beam of the target cell on which the communication element or function successfully accessed the target cell when conducting the handover procedure is added.

When the communication network control element or function is configured by a CU/DU configuration, the beam information is sent to a one of the CU and to DU.

Furthermore, according to examples of embodiments, in case the handover procedure to the target cell failed, the UE re-establishes a communication connection to a recovery cell being a communication cell of the communication network. In this case, the beam information is sent to a communication network control element or function of the recovery cell. That is, the UE determines a communication beam of the target cell to which the handover failed, and includes in the beam information caused to be sent to the communication network control element or function of the recovery cell an indication of the communication beam of the target cell to which the handover failed.

According to further examples of embodiments, handover supporting information from a communication network control element or function of the source cell is received and processed in the UE. The handover supporting information indicate at least one preferred communication beam per candidate target cell for a handover in relation to a communication beam of the source cell serving the communication element or function at the time of conducting the handover procedure. The handover procedure to a target cell is executed by the UE under consideration of the handover support information for selecting a communication beam of the target cell for accessing the target cell.

Figure 11:
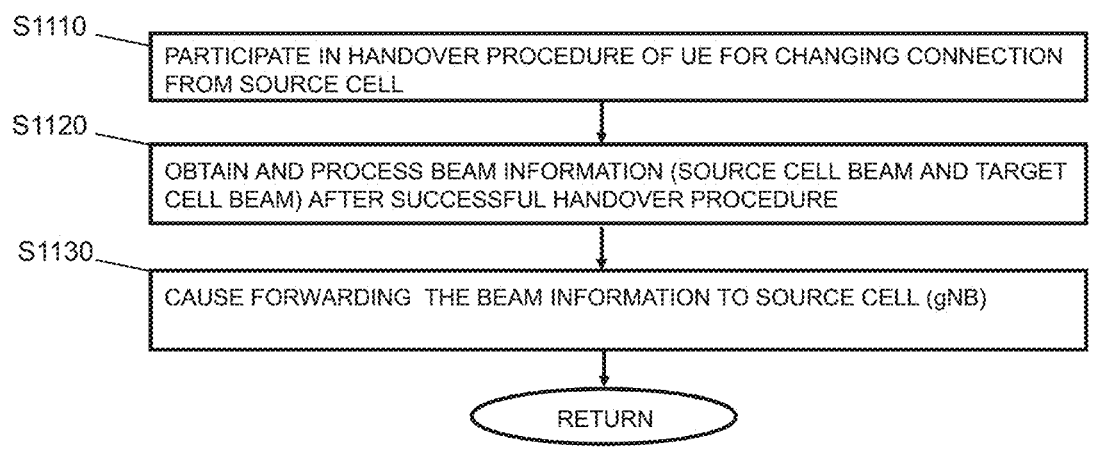
FIG. 11 shows a flow chart of a communication connection control procedure executed by a communication network control element or function like a gNB of a target cell in a handover procedure according to some examples of embodiments.

FIG. 11 shows a flow chart of a communication connection control procedure executed by a communication network control element or function like a gNB of a target cell in a handover procedure according to some examples of embodiments. That is, FIG. 11 is related to a processing when the handover to the target cell succeeded.

In S1110, the apparatus (e.g. in the target cell gNB 25) participates in a handover procedure for changing a communication connection of a communication element or function (e.g. UE 10) from a source cell (e.g. cell 1) currently serving the communication element or function to a target cell (the own cell, e.g. cell 2)

In S1120, when the handover is successfully completed, beam information indicating a communication beam of the source cell serving the communication element or function at the time when the handover procedure is executed is obtained and processed.

According to examples of embodiments, the beam information is received in a handover confirmation signaling from the communication element or function.

Furthermore, according to examples of embodiments, as part of the beam information, an indication of a communication beam of the target cell on which the communication element or function successfully accessed the target cell when conducting the handover procedure is obtained. The indication of a communication beam of the target cell on which the communication element or function successfully accessed the target cell is received from the communication element or function, or is determined in the communication network control element or function of the target cell.

In S1130, the beam information is forwarded to a communication network control element or function of the source cell.

According to further examples of embodiments, forwarding of the beam information to the communication network control element or function of the source cell is done in a context release signaling via a dedicated interface between communication network control elements or functions of the source cell and the target cell.

Furthermore, according to examples of embodiments, the communication network control element or function comprises a central unit and at least one distributed unit (i.e. a CU/DU configuration). Then, the beam information can be obtained at least in part by the DU and forwarded to the CU. Furthermore, forwarding of the beam information to the communication network control element or function of the source cell is caused by the CU.

Figure 12:
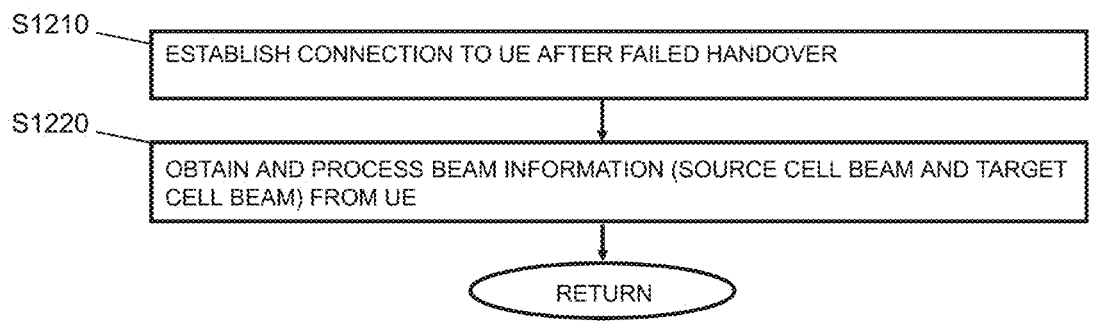
FIG. 12 shows a flow chart of a communication connection control procedure executed by a communication network control element or function like a gNB of a recovery cell according to some examples of embodiments.

FIG. 12 shows a flow chart of a communication connection control procedure executed by a communication network control element or function like a gNB of a recovery cell according to some examples of embodiments. That is, FIG. 12 is related to a processing when the handover to the target cell failed.

In S1210, the apparatus (e.g. in the gNB of the recovery cell) establishes a communication connection to a communication element or function after a handover procedure for changing a communication connection of the communication element or function from a source cell to a target cell is failed.

Then, in S1202, beam information from the communication element or function are obtained and processed, which indicates a communication beam of the source cell serving the communication element or function at the time when the handover procedure is executed.

According to examples of embodiments, the beam information further includes an indication of a communication beam of the target cell to which the handover failed.

Moreover, according to examples of embodiments, in case the communication connection to the communication element or function is re-established to the source cell (i.e. the recovery cell is the source cell), the beam information is processed by using it for generating handover supporting information indicating at least one preferred communication beam per candidate target cell for a handover in relation to a communication beam of the source cell serving the communication element or function at the time of conducting the handover procedure. Otherwise, in case the communication connection to the communication element or function is re-established to a communication cell being different to the source cell, the beam information is processed by causing forwarding the beam information to the communication network control element or function of the source cell.

Figure 13:
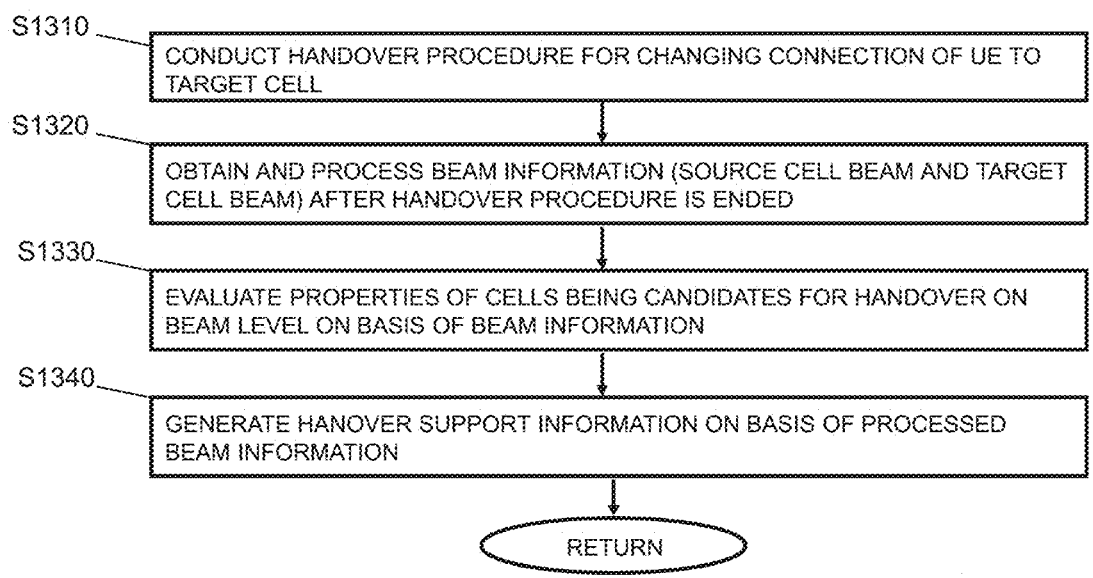
FIG. 13 shows a flow chart of a communication connection control procedure executed by a communication network control element or function like a gNB of a source cell in a handover procedure according to some examples of embodiments.

FIG. 13 shows a flow chart of a communication connection control procedure executed by a communication network control element or function like a gNB of a source cell in a handover procedure according to some examples of embodiments.

In S1310, the apparatus (e.g. in the source cell gNB 20) conducts a handover procedure for changing a communication connection of a communication element or function (e.g. UE 10) from the source cell (e.g. cell 1) currently serving the communication element or function to a target cell (e.g. cell 2).

In S1320, when the handover procedure is ended (i.e. succeeded or failed), beam information indicating communication beams involved in the handover procedure on a side of the source cell and on a side of the target cell are obtained and processed.

In S1330 the beam information is processed for evaluating properties of communication cells being candidates for handover procedure on a communication beam level.

In S1340, generating handover support information is generated on the basis of the processed beam information. The handover supporting information indicates at least one preferred communication beam per candidate target cell for a handover in relation to a communication beam of the source cell serving the communication element or function at the time of conducting the handover procedure.

According to some examples of embodiments, in case the handover procedure is completed successfully by connecting the communication element or function to the target cell, the beam information is received from a communication network control element or function of the target cell in a context release signaling via a dedicated interface between communication network control elements or functions of the source cell and the target cell. The beam information comprises an indication of the communication beam of the source cell serving the communication element or function at the time when the handover procedure is executed, and an indication of the communication beam of the target cell on which the communication element or function successfully accessed the target cell when conducting the handover procedure.

On the other hand, in case the handover procedure to the target cell failed, according to some examples of embodiments, the beam information is obtained from a communication network control element or function of a communication cell to which the communication element established a communication connection after the failed handover to the target cell. The beam information comprises an indication of the communication beam of the source cell serving the communication element or function at the time when the handover procedure is executed, and an indication of the communication beam of the target cell to which the handover failed.

According to some examples of embodiments, the communication network control element or function (of the source cell) can comprise a CU and at least one DU (CU/DU configuration). Then, at least a part of the beam information can be obtained by the at least one DU and forwarded to the CU for indicating the communication beam of the source cell serving the communication element or function at the time when the handover procedure is executed. The beam information is processed by the CU.

Furthermore, according to some examples of embodiments, for generating the handover support information on the basis of the processed beam information, results of handover procedures between at least one communication beam of the source cell to at least one communication beam of at least one target cell are reflected. The results indicate at least one of a number of successful handover procedures and a number of failed handover procedures. In addition, according to some examples of embodiments, it is possible, for generating the handover support information, to consider measurement results related to a communication quality of communication beams of neighboring communication cells.

According to some examples of embodiments, the handover supporting information can be sent to a communication element or function (UE) executing a handover procedure to a target cell in a handover command signaling to the communication element or function. Furthermore, according to some examples of embodiments, in the handover supporting information caused to be sent to the communication element or function, information related to candidate target cells being reported to be receivable by the communication element or function are included, i.e. the amount of information provided to the UE is limited by informing only about reasonable target cell relations.

Figure 14:
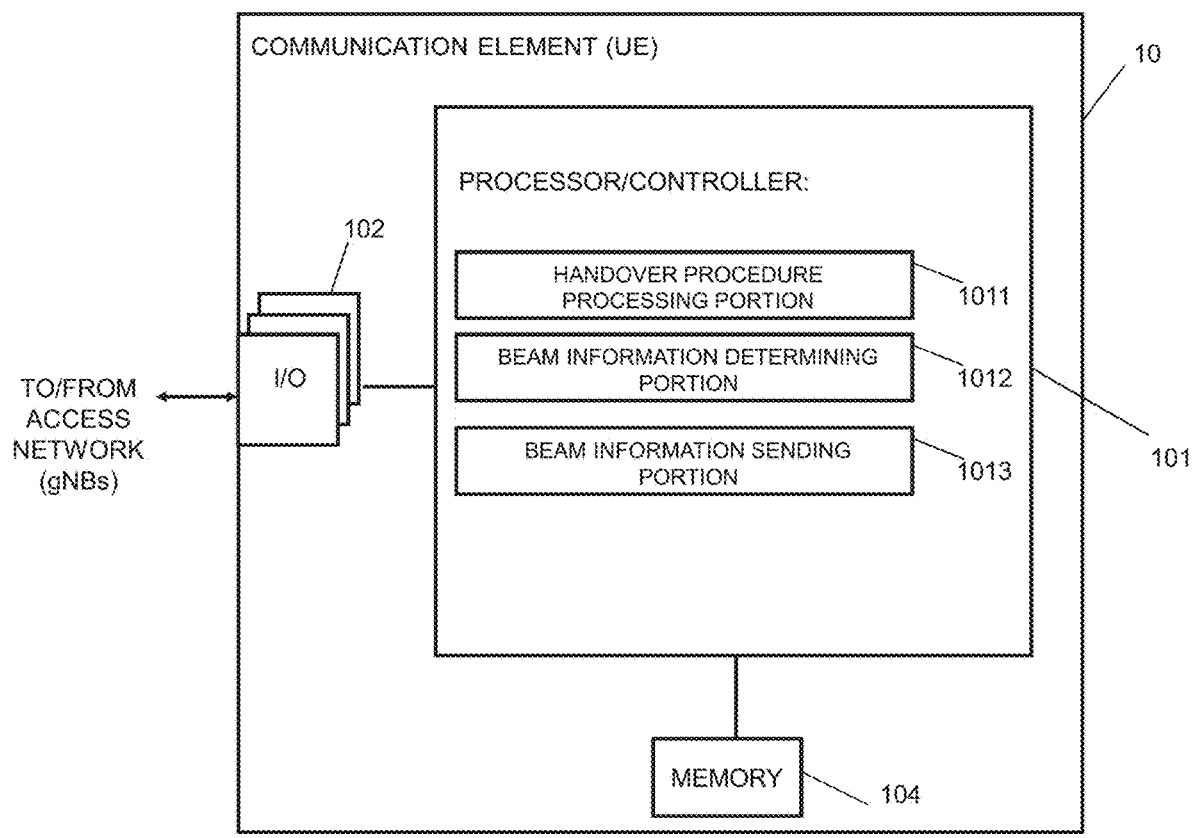
FIG. 14 shows a diagram of a network element or function acting as a communication element according to some examples of embodiments.

FIG. 14 shows a diagram of a network element or function acting as a communication element according to some examples of embodiments, e.g. the UE 10 of FIG. 2, which is configured to conduct a communication connection control procedure as described in connection with some of the examples of embodiments. It is to be noted that the communication element or function, like the UE 10 of FIG. 2, may include further elements or functions besides those described herein below. Furthermore, even though reference is made to a communication element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication element like the UE 10 shown in FIG. 14 may include a processing circuitry, a processing function, a control unit or a processor 101, such as a CPU or the like, which is suitable for executing instructions given by programs or the like related to the communication connection control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 102 denotes input/output (I/O) units or functions (interfaces) connected to the processor or processing function 101. The I/O units 102 may be used for communicating with the network, e.g. a gNB, as described in connection with FIG. 2, for example. The I/O units 102 may be a combined unit including communication equipment towards several entities, or may include a distributed structure with a plurality of different interfaces for different entities. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described communication connection control processing. In particular, the processor or processing circuitry or function 101 includes one or more of the following sub-portions. Sub-portion 1011 is a processing portion which is usable as a portion for executing a handover processing. The portion 1011 may be configured to perform processing according to S1010 of FIG. 10, Furthermore, the processor or processing circuitry or function 101 may include a sub-portion 1012 usable as a portion for determining beam information. The portion 1012 may be configured to perform a processing according to S1020 of FIG. 10, In addition, the processor or processing circuitry or function 101 may include a sub-portion 1013 usable as a portion for causing sending of beam information. The portion 1013 may be configured to perform a processing according to S1030 of FIG. 10.

Figure 15:
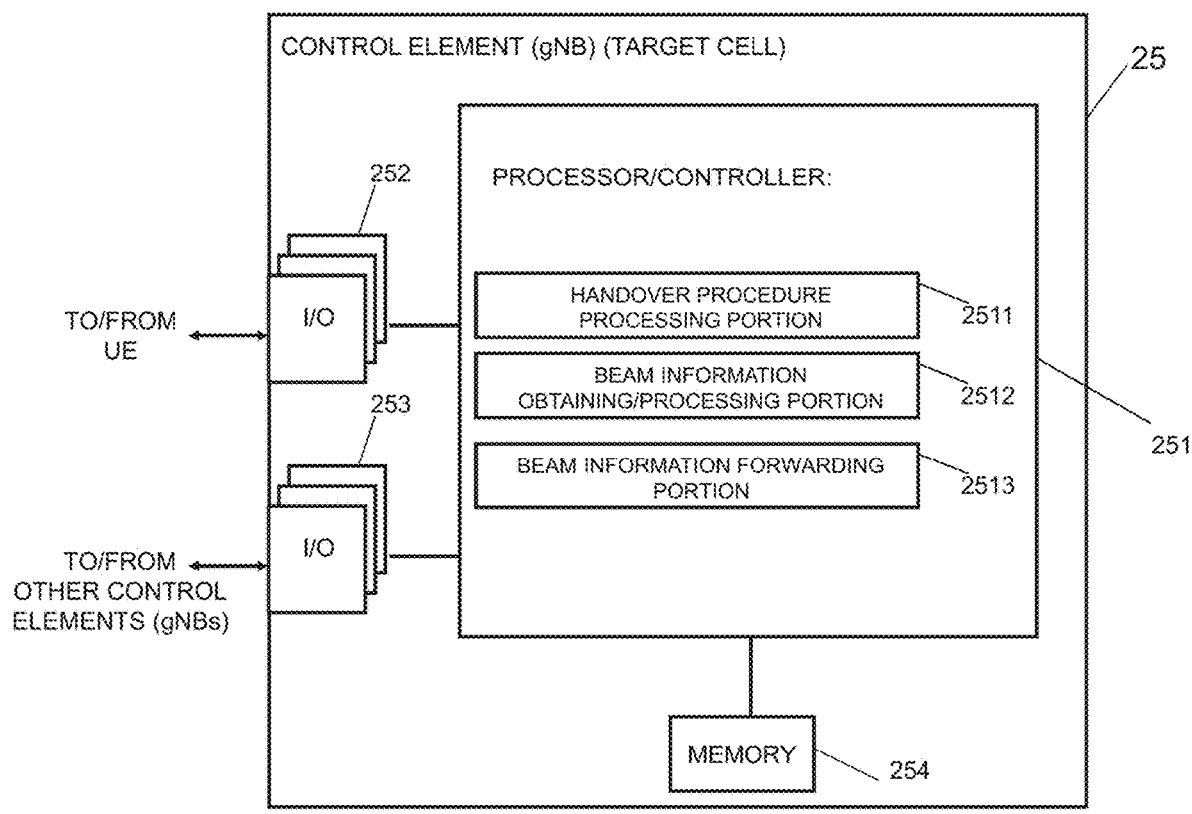
FIG. 15 shows a diagram of a network element or function acting as a communication network control element in a target cell according to some examples of embodiments.

FIG. 15 shows a diagram of a network element or function acting as a communication network control element in a target cell according to some examples of embodiments, e.g. the gNB 25 of FIG. 2, which is configured to conduct a communication connection control procedure as described in connection with some of the examples of embodiments. It is to be noted that the control element or function, like the gNB 25 of FIG. 2, may include further elements or functions besides those described herein below. Furthermore, even though reference is made to a control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The control element like the gNB 25 shown in FIG. 15 may include a processing circuitry, a processing function, a control unit or a processor 251, such as a CPU or the like, which is suitable for executing instructions given by programs or the like related to the communication connection control procedure. The processor 251 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 252 and 253 denote input/output (I/O) units or functions (interfaces) connected to the processor or processing function 251. The I/O units 252 may be used for communicating with the communication elements or function, e.g. a UE, as described in connection with FIG. 2, for example. The I/O units 253 may be used for communicating with other network elements or functions, e.g. the core network or other gNBs, as described in connection with FIG. 2, for example. The I/O units 252 and 253 may be a combined unit including communication equipment towards several entities, or may include a distributed structure with a plurality of different interfaces for different entities. Reference sign 254 denotes a memory usable, for example, for storing data and programs to be executed by the processor or processing function 251 and/or as a working storage of the processor or processing function 251. It is to be noted that the memory 254 may be implemented by using one or more memory portions of the same or different type of memory.

The processor or processing function 251 is configured to execute processing related to the above described communication connection control processing. In particular, the processor or processing circuitry or function 251 includes one or more of the following sub-portions. Sub-portion 2511 is a processing portion which is usable as a portion for executing a handover processing. The portion 2511 may be configured to perform processing according to S1110 of FIG. 11. Furthermore, the processor or processing circuitry or function 251 may include a sub-portion 2512 usable as a portion for obtaining and processing beam information. The portion 2512 may be configured to perform a processing according to S1120 of FIG. 11. In addition, the processor or processing circuitry or function 251 may include a sub-portion 2513 usable as a portion for forwarding the beam information. The portion 2513 may be configured to perform a processing according to S1130 of FIG. 11.

Figure 16:
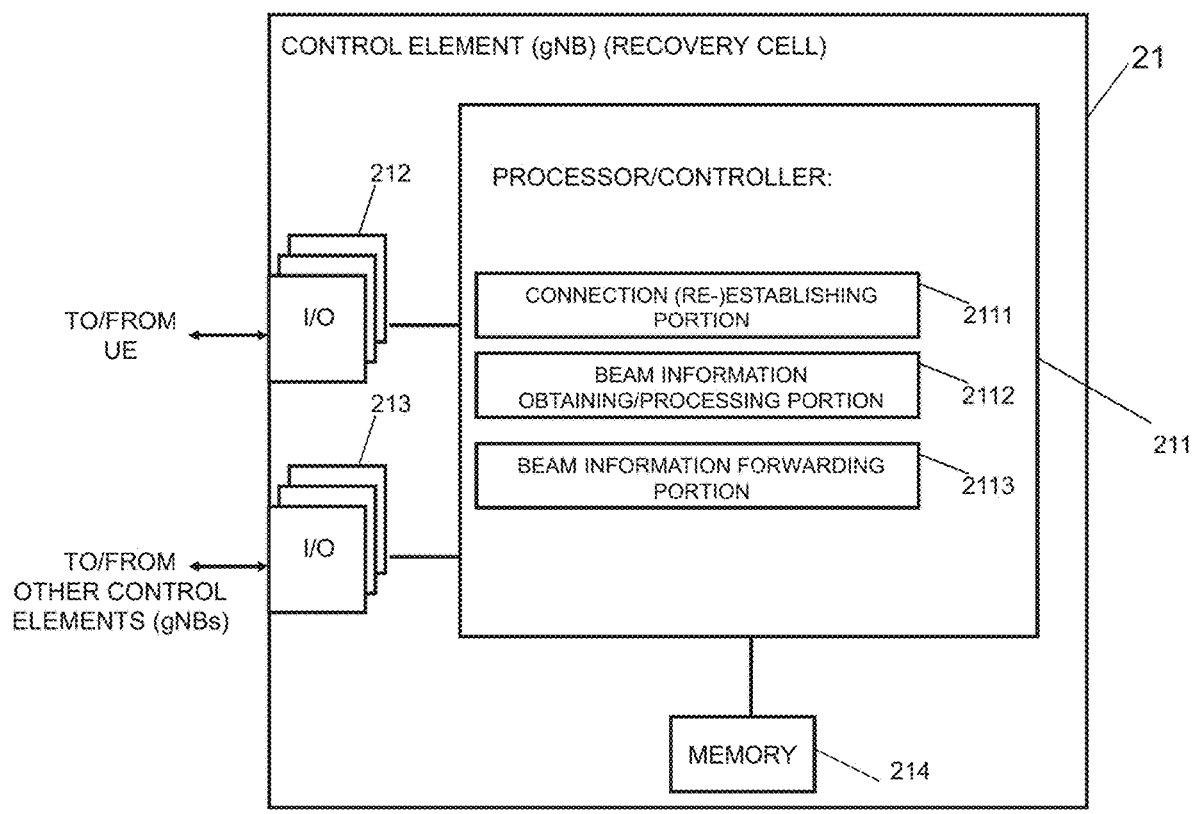
FIG. 16 shows a diagram of a network element or function acting as a communication network control element in a recovery cell according to some examples of embodiments.

FIG. 16 shows a diagram of a network element or function acting as a communication network control element in a recovery cell according to some examples of embodiments, e.g. gNB of FIG. 2, which is configured to conduct a communication connection control procedure as described in connection with some of the examples of embodiments. It is to be noted that the control element or function, like a gNB of FIG. 2, may include further elements or functions besides those described herein below. Furthermore, even though reference is made to a control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The control element like the gNB 21 shown in FIG. 16 may include a processing circuitry, a processing function, a control unit or a processor 211, such as a CPU or the like, which is suitable for executing instructions given by programs or the like related to the communication connection control procedure. The processor 211 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 212 and 213 denote input/output (I/O) units or functions (interfaces) connected to the processor or processing function 211. The I/O units 212 may be used for communicating with the communication elements or function, e.g. a UE, as described in connection with FIG. 2, for example. The I/O units 213 may be used for communicating with other network elements or functions, e.g. the core network or other gNBs, as described in connection with FIG. 2, for example. The I/O units 212 and 213 may be a combined unit including communication equipment towards several entities, or may include a distributed structure with a plurality of different interfaces for different entities. Reference sign 214 denotes a memory usable, for example, for storing data and programs to be executed by the processor or processing function 211 and/or as a working storage of the processor or processing function 211. It is to be noted that the memory 214 may be implemented by using one or more memory portions of the same or different type of memory.

The processor or processing function 211 is configured to execute processing related to the above described communication connection control processing. In particular, the processor or processing circuitry or function 211 includes one or more of the following sub-portions. Sub-portion 2111 is a processing portion which is usable as a portion for (re-)establishing a connection to a UE. The portion 2111 may be configured to perform processing according to S1210 of FIG. 12. Furthermore, the processor or processing circuitry or function 211 may include a sub-portion 2112 usable as a portion for obtaining and processing beam information. In addition, the processor or processing circuitry or function 211 may include a sub-portion 2113 usable as a portion for forwarding the beam information. The portions 2112 and 2113 may be configured to perform a processing according to S1220 of FIG. 12.

Figure 17:
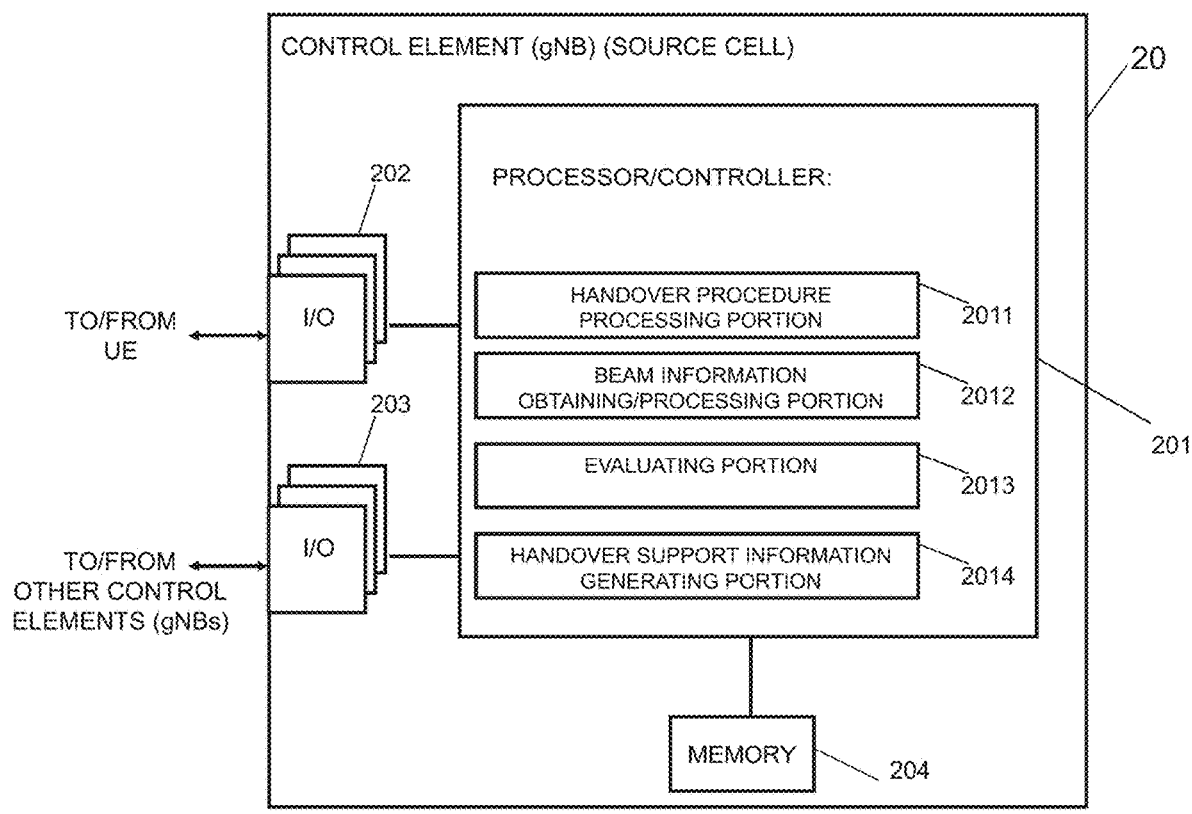
FIG. 17 shows a diagram of a network element or function acting as a communication network control element in a source cell according to some examples of embodiments.

FIG. 17 shows a diagram of a network element or function acting as a communication network control element in a source cell according to some examples of embodiments, e.g. the gNB 20 of FIG. 2, which is configured to conduct a communication connection control procedure as described in connection with some of the examples of embodiments. It is to be noted that the control element or function, like the gNB 20 of FIG. 2, may include further elements or functions besides those described herein below. Furthermore, even though reference is made to a control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The control element like the gNB 20 shown in FIG. 17 may include a processing circuitry, a processing function, a control unit or a processor 201, such as a CPU or the like, which is suitable for executing instructions given by programs or the like related to the communication connection control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 202 and 203 denote input/output (I/O) units or functions (interfaces) connected to the processor or processing function 201. The I/O units 202 may be used for communicating with the communication elements or function, e.g. a UE, as described in connection with FIG. 2, for example. The I/O units 203 may be used for communicating with other network elements or functions, e.g. the core network or other gNBs, as described in connection with FIG. 2, for example. The I/O units 202 and 203 may be a combined unit including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described communication connection control processing. In particular, the processor or processing circuitry or function 201 includes one or more of the following sub-portions. Sub-portion 2011 is a processing portion which is usable as a portion for executing a handover processing. The portion 2011 may be configured to perform processing according to S1310 of FIG. 13. Furthermore, the processor or processing circuitry or function 201 may include a sub-portion 2012 usable as a portion for obtaining and processing beam information. The portion 2012 may be configured to perform a processing according to S1320 of FIG. 13. In addition, the processor or processing circuitry or function 201 may include a sub-portion 2013 usable as a portion for conducting evaluation. The portion 2013 may be configured to perform a processing according to S1330 of FIG. 13. Furthermore, the processor or processing circuitry or function 201 may include a sub-portion 2014 usable as a portion for generating handover support information. The portion 2014 may be configured to perform a processing according to S1340 of FIG. 13.

As discussed above, a processing is discussed in which information related to a serving beam at the source cell and a beam of the target cell to which an access attempt is made in a handover procedure is provided to the source cell in order to allow to determine a handover performance on a beam level. Thus, it is possible to improve the handover processing by tailoring handover commands under consideration of the respective beams in the cells.

It is to be noted that examples of embodiments of the invention are applicable to various different network configurations. In other words, the examples shown in the above described figures, which are used as a basis for the above discussed examples, are only illustrative and do not limit the present invention in any way. That is, additional further existing and proposed new functionalities available in a corresponding operating environment may be used in connection with examples of embodiments of the invention based on the principles defined.

According to a further example of embodiments, there is provided, for example, an apparatus for use by a communication element or function configured to communicate in a communication network comprising a plurality of communication cells, the apparatus comprising means for executing a handover procedure for changing a communication connection from a source cell currently serving the communication element or function to a target cell; means for determining beam information indicating a communication beam of the source cell serving the communication element or function at the time when the handover procedure is executed; and means for causing sending the beam information to a communication network control element or function to which the communication element is connected after the handover procedure is ended.

Furthermore, according to some other examples of embodiments, the above defined apparatus may further comprise means for conducting at least one of the processing defined in the above described methods, for example a method according that described in connection with FIG. 10. Specifically, in case the handover procedure is completed successfully by connecting the communication element or function to the target cell, the beam information is caused to be sent to a communication network control element or function.

Furthermore, the above defined apparatus comprises means for causing sending of the beam information in a handover confirmation signaling.

Furthermore, the above defined apparatus comprises means for determining a communication beam of the target cell on which the communication element or function successfully accessed the target cell when conducting the handover procedure, and means for including in the beam information caused to be sent to the communication network control element or function of the target cell an indication of the communication beam of the target cell on which the communication element or function successfully accessed the target cell when conducting the handover procedure.

Furthermore, the above defined apparatus comprises means for causing sending of the beam information to a one of a central unit of the communication network control element or function of the target cell or to a distributed unit of the communication network control element or function of the target cell.

Furthermore, the above defined apparatus comprises, in case the handover procedure to the target cell failed, means for re-establishing a communication connection to a recovery cell being a communication cell of the communication network; and means for causing sending of the beam information to a communication network control element or function of the recovery cell.

Furthermore, the above defined apparatus comprises means for determining a communication beam of the target cell to which the handover failed, and means for including in the beam information caused to be sent to the communication network control element or function of the recovery cell an indication of the communication beam of the target cell to which the handover failed.

Furthermore, the above defined apparatus comprises means for receiving and processing handover supporting information from a communication network control element or function of the source cell, wherein the handover supporting information indicate at least one preferred communication beam per candidate target cell for a handover in relation to a communication beam of the source cell serving the communication element or function at the time of conducting the handover procedure; and means for conducting the handover procedure to a target cell under consideration of the handover support information for selecting a communication beam of the target cell for accessing the target cell.

According to a further example of embodiments, there is provided, for example, an apparatus for use by a communication network control element or function of a communication cell configured to communicate with a communication element or function in a communication network comprising a plurality of communication cells, the apparatus comprising means for participating in a handover procedure for changing a communication connection of the communication element or function from a source cell currently serving the communication element or function to a target cell; means for obtaining and processing, when the handover is successfully completed, beam information indicating a communication beam of the source cell serving the communication element or function at the time when the handover procedure is executed; and means for causing forwarding the beam information to a communication network control element or function of the source cell.

Furthermore, according to some other examples of embodiments, the above defined apparatus may further comprise means for conducting at least one of the processing defined in the above described methods, for example a method according that described in connection with FIG. 11. Specifically, the above defined apparatus further comprises means for receiving the beam information in a handover confirmation signaling from the communication element or function.

Furthermore, the above defined apparatus comprises means for obtaining, as part of the beam information, an indication of a communication beam of the target cell on which the communication element or function successfully accessed the target cell when conducting the handover procedure, wherein the indication of a communication beam of the target cell on which the communication element or function successfully accessed the target cell is received from the communication element or function, or is determined in the communication network control element or function of the target cell.

Furthermore, for above defined apparatus, the communication network control element or function comprises a central unit and at least one distributed unit, the beam information is obtained at least in part by the at least one distributed unit and forwarded to the central unit, and forwarding of the beam information to the communication network control element or function of the source cell is caused by the central unit.

Furthermore, the above defined apparatus comprises means for causing forwarding the beam information to the communication network control element or function of the source cell in a context release signaling via a dedicated interface between communication network control elements or functions of the source cell and the target cell.

According to a further example of embodiments, there is provided, for example, an apparatus for use by a communication network control element or function of a communication cell configured to communicate with a communication element or function in a communication network comprising a plurality of communication cells, the apparatus comprising means for establishing a communication connection to a communication element or function after a handover procedure for changing a communication connection of the communication element or function from a source cell to a target cell is failed; and means for obtaining and processing beam information from the communication element or function indicating a communication beam of the source cell serving the communication element or function at the time when the handover procedure is executed.

Furthermore, according to some other examples of embodiments, the above defined apparatus may further comprise means for conducting at least one of the processing defined in the above described methods, for example a method according that described in connection with FIG. 12. Specifically, the beam information further includes an indication of a communication beam of the target cell to which the handover failed.

Furthermore, the above defined apparatus comprises in case the communication connection to the communication element or function is re-established to the source cell means for processing the beam information by using it for generating handover supporting information indicating at least one preferred communication beam per candidate target cell for a handover in relation to a communication beam of the source cell serving the communication element or function at the time of conducting the handover procedure.

Furthermore, the above defined apparatus comprises in case the communication connection to the communication element or function is re-established to the communication cell being different to the source cell means for processing the beam information by causing forwarding the beam information to the communication network control element or function of the source cell.

According to a further example of embodiments, there is provided, for example, an apparatus for use by a communication network control element or function of a communication cell configured to communicate with a communication element or function in a communication network comprising a plurality of communication cells, the apparatus comprising means for conducting a handover procedure for changing a communication connection of the communication element or function from a source cell currently serving the communication element or function to a target cell; means for obtaining and processing, when the handover procedure is ended, beam information indicating communication beams involved in the handover procedure on a side of the source cell and on a side of the target cell; means for processing the beam information for evaluating properties of communication cells being candidates for handover procedure on a communication beam level; and means for generating handover support information on the basis of the processed beam information, the handover supporting information indicating at least one preferred communication beam per candidate target cell for a handover in relation to a communication beam of the source cell serving the communication element or function at the time of conducting the handover procedure.

Furthermore, according to some other examples of embodiments, the above defined apparatus may further comprise means for conducting at least one of the processing defined in the above described methods, for example a method according that described in connection with FIG. 13. Specifically, in case the handover procedure is completed successfully by connecting the communication element or function to the target cell, the beam information is received from a communication network control element or function of the target cell in a context release signaling via a dedicated interface between communication network control elements or functions of the source cell and the target cell, and the beam information comprises an indication of the communication beam of the source cell serving the communication element or function at the time when the handover procedure is executed, and an indication of the communication beam of the target cell on which the communication element or function successfully accessed the target cell when conducting the handover procedure.

Furthermore, for the above defined apparatus, in case the handover procedure to the target cell failed, the beam information is obtained from a communication network control element or function of a communication cell to which the communication element established a communication connection, and the beam information comprises an indication of the communication beam of the source cell serving the communication element or function at the time when the handover procedure is executed, and an indication of the communication beam of the target cell to which the handover failed.

Furthermore, for the above defined apparatus, the communication network control element or function comprises a central unit and at least one distributed unit, at least a part of the beam information is obtained by the at least one distributed unit and forwarded to the central unit for indicating the communication beam of the source cell serving the communication element or function at the time when the handover procedure is executed, and the beam information is processed by the central unit.

Furthermore, the above defined apparatus comprises, for generating the handover support information on the basis of the processed beam information, means for reflecting results of handover procedures between at least one communication beam of the source cell to at least one communication beam of at least one target cell, wherein the results indicate at least one of a number of successful handover procedures and a number of failed handover procedures.

Furthermore, the above defined apparatus comprises, for generating the handover support information, means for considering measurement results related to a communication quality of communication beams of neighboring communication cells.

Furthermore, the above defined apparatus comprises means for causing sending of the handover supporting information to a communication element or function executing a handover procedure to a target cell in a handover command signaling to the communication element or function.

Furthermore, the above defined apparatus comprises means for considering, in the handover supporting information caused to be sent to the communication element or function, information related to candidate target cells being reported to be receivable by the communication element or function.

According to a further example of embodiments, there is provided, for example, a non-transitory computer readable medium comprising program instructions for causing an apparatus to perform at least the following; executing a handover procedure for changing a communication connection from a source cell currently serving the communication element or function to a target cell; determining beam information indicating a communication beam of the source cell serving the communication element or function at the time when the handover procedure is executed; and causing sending the beam information to a communication network control element or function to which the communication element is connected after the handover procedure is ended.

According to a further example of embodiments, there is provided, for example, a non-transitory computer readable medium comprising program instructions for causing an apparatus to perform at least the following; participating in a handover procedure for changing a communication connection of the communication element or function from a source cell currently serving the communication element or function to a target cell; obtaining and processing, when the handover is successfully completed, beam information indicating a communication beam of the source cell serving the communication element or function at the time when the handover procedure is executed; and causing forwarding the beam information to a communication network control element or function of the source cell.

According to a further example of embodiments, there is provided, for example, a non-transitory computer readable medium comprising program instructions for causing an apparatus to perform at least the following: establishing a communication connection to a communication element or function after a handover procedure for changing a communication connection of the communication element or function from a source cell to a target cell is failed; and obtaining and processing beam information from the communication element or function indicating a communication beam of the source cell serving the communication element or function at the time when the handover procedure is executed.

According to a further example of embodiments, there is provided, for example, a non-transitory computer readable medium comprising program instructions for causing an apparatus to perform at least the following: conducting a handover procedure for changing a communication connection of the communication element or function from a source cell currently serving the communication element or function to a target cell; obtaining and processing, when the handover procedure is ended, beam information indicating communication beams involved in the handover procedure on a side of the source cell and on a side of the target cell; processing the beam information for evaluating properties of communication cells being candidates for handover procedure on a communication beam level; and generating handover support information on the basis of the processed beam information, the handover supporting information indicating at least one preferred communication beam per candidate target cell for a handover in relation to a communication beam of the source cell serving the communication element or function at the time of conducting the handover procedure.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus for use by user equipment configured to communicate in a communication network comprising a plurality of communication cells, the apparatus comprising
at least one processing circuitry, and
at least one memory for storing instructions to be executed by the processing circuitry,
wherein the at least one memory and the instructions are configured to, with the at least one processing circuitry, cause the apparatus at least:
to execute a handover procedure for changing a communication connection from a source cell currently serving the user equipment to a target cell;
to determine beam information indicating a communication beam of the source cell serving the user equipment at the time when the handover procedure is executed; and
to cause sending the beam information to a communication network relay or base station to which the user equipment is connected after the handover procedure is ended, wherein one of the handover procedure is successful and the communication network relay or base station is the target cell or the handover procedure is a failure and the communication network relay or base station is a recovery cell.

2. The apparatus according to claim 1, wherein the handover procedure is successful by connecting the user equipment to the target cell, the beam information is caused to be sent to one or more central units of the communication network.

3. The apparatus according to claim 1, wherein the at least one memory and the instructions are further configured to, with the at least one processing circuitry, cause the apparatus at least:
to cause sending of the beam information in a handover confirmation signaling.

4. The apparatus according to claim 3, wherein the at least one memory and the instructions are further configured to, with the at least one processing circuitry, cause the apparatus at least:
to determine a communication beam of the target cell on which the user equipment successfully accessed the target cell when conducting the handover procedure, and
to include in the beam information caused to be sent to the communication network relay or base station of the target cell an indication of the communication beam of the target cell on which the user equipment successfully accessed the target cell when conducting the handover procedure.

5. The apparatus according to claim 2, wherein the at least one memory and the instructions are further configured to, with the at least one processing circuitry, cause the apparatus at least:
to cause sending of the beam information to a one of a central unit of the communication network relay or base station of the target cell or to a distributed unit of the communication network relay or base station of the target cell.

6. The apparatus according to claim 1, wherein the at least one memory and the instructions are further configured to, with the at least one processing circuitry, cause the apparatus at least:
to determine a communication beam of the target cell to which the handover procedure failed, and
to include in the beam information caused to be sent to the communication network relay or base station of the recovery cell an indication of the communication beam of the target cell to which the handover procedure failed.

7. The apparatus according to claim 1, wherein the at least one memory and the instructions are further configured to, with the at least one processing circuitry, cause the apparatus at least:
to receive and process handover supporting information from a communication network relay or base station of the source cell, wherein the handover supporting information indicate at least one preferred communication beam per candidate target cell for a handover in relation to a communication beam of the source cell serving the user equipment at the time of conducting the handover procedure; and
to conduct the handover procedure to a target cell under consideration of the handover support information for selecting a communication beam of the target cell for accessing the target cell.

8. A method for use in user equipment configured to communicate in a communication network comprising a plurality of communication cells, the method comprising
executing a handover procedure for changing a communication connection from a source cell currently serving the user equipment to a target cell;
determining beam information indicating a communication beam of the source cell serving the user equipment at the time when the handover procedure is executed; and
causing sending the beam information to a communication network relay or base station to which the communication element is connected after the handover procedure is ended, wherein one of the handover procedure is successful and the communication network relay or base station is part of the target cell, or the handover procedure fails and the communication network relay or base station is part of a recovery cell.

9. The method according to claim 8, wherein the handover procedure is successful by connecting the user equipment to the target cell, the beam information is caused to be sent to one or more central units of the communication network.

10. The method according to claim 8, further comprising causing sending of the beam information in a handover confirmation signaling.

11. The method according to claim 10, further comprising
determining a communication beam of the target cell on which the user equipment successfully accessed the target cell when conducting the handover procedure, and
including in the beam information caused to be sent to the communication network relay or base station of the target cell an indication of the communication beam of the target cell on which the user equipment successfully accessed the target cell when conducting the handover procedure.

12. The method according to claim 10, further comprising causing sending of the beam information to a one of a central unit of the communication network relay or base station of the target cell or to a distributed unit of the communication network relay or base station of the target cell.

13. The method according to claim 8, further comprising
determining a communication beam of the target cell to which the handover failed, and
including in the beam information caused to be sent to the communication network relay or base station of the recovery cell an indication of the communication beam of the target cell to which the handover failed.

14. The method according to claim 8, further comprising
receiving and processing handover supporting information from a communication network relay or base station of the source cell, wherein the handover supporting information indicate at least one preferred communication beam per candidate target cell for a handover in relation to a communication beam of the source cell serving the user equipment at the time of conducting the handover procedure; and
conducting the handover procedure to a target cell under consideration of the handover support information for selecting a communication beam of the target cell for accessing the target cell.

15. A computer program product having a series of operating instructions stored on a non-transitory computer-readable medium that directs a data processing apparatus when executed thereby to perform operations to enable a user equipment configured to communicate in a communication network comprising a plurality of communication cells, the operations comprising:
executing a handover procedure for changing a communication connection from a source cell currently serving the user equipment to a target cell;

determining beam information indicating a communication beam of the source cell serving the user equipment at the time when the handover procedure is executed; and causing sending the beam information to a communication network relay or base station to which the communication element is connected after the handover procedure is ended, wherein one of the handover procedure is successful and the communication network relay or base station is part of the target cell, or the handover procedure fails and the communication network relay or base station is part of a recovery cell.

16. The computer program product according to claim 15, wherein the handover procedure is successful by connecting the user equipment to the target cell, the beam information is caused to be sent to one or more central units of the communication network.

17. The computer program product according to claim 15 wherein the beam information is in a handover confirmation signaling.

18. The computer program product according to claim 16, further comprising
determining a communication beam of the target cell on which the user equipment successfully accessed the target cell when conducting the handover procedure, and
including in the beam information caused to be sent to the communication network relay or base station of the target cell an indication of the communication beam of the target cell on which the user equipment successfully accessed the target cell when conducting the handover procedure.

19. The computer program product according to claim 15, further comprising:
to establish a communication connection to a recovery cell when the handover procedure fails, wherein the recovery cell is a communication cell of the communication network; and
including in the beam information caused to be sent to the communication network relay or base station of the recovery cell, an indication of the communication beam of the target cell to which the handover failed.

20. The computer program product according to claim 15, further comprising:
receiving and processing handover supporting information from a communication network relay or base station of the source cell, wherein the handover supporting information indicate at least one preferred communication beam per candidate target cell for a handover in relation to a communication beam of the source cell serving the user equipment at the time of conducting the handover procedure; and
conducting the handover procedure to a target cell under consideration of the handover support information for selecting a communication beam of the target cell for accessing the target cell.

* * * * *